US009547432B2

(12) United States Patent
Lee et al.

(10) Patent No.: US 9,547,432 B2
(45) Date of Patent: Jan. 17, 2017

(54) MOBILE TERMINAL AND CONTROL METHOD THEREOF

(71) Applicant: LG ELECTRONICS INC., Seoul (KR)

(72) Inventors: Suyoung Lee, Seoul (KR); Sungyoung Yoon, Seoul (KR); Jieun Lee, Seoul (KR); Victoria Bondarchuk, St. Petersburg (RU)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/179,405

(22) Filed: Feb. 12, 2014

(65) Prior Publication Data

US 2014/0282047 A1    Sep. 18, 2014

(30) Foreign Application Priority Data

Mar. 15, 2013 (KR) .......................... 10-2013-0028263

(51) Int. Cl.
G06F 3/00       (2006.01)
G06F 3/0488    (2013.01)
H04M 1/66      (2006.01)
H04M 1/725    (2006.01)

(52) U.S. Cl.
CPC .............. *G06F 3/0488* (2013.01); *H04M 1/66* (2013.01); *H04M 1/72519* (2013.01); *H04M 2250/22* (2013.01)

(58) Field of Classification Search
CPC ........................... G06F 3/04883; G06F 3/0488
See application file for complete search history.

(56) References Cited

U.S. PATENT DOCUMENTS

| 8,892,170 | B2* | 11/2014 | Teng ....................... H04M 1/67 455/411 |
| 8,904,311 | B2* | 12/2014 | Nurmi ................... G06F 3/0485 715/862 |
| 2011/0050602 | A1 | 3/2011 | Jeong et al. |
| 2011/0276911 | A1 | 11/2011 | Choi |
| 2012/0046079 | A1 | 2/2012 | Kim et al. |
| 2012/0311499 | A1* | 12/2012 | Dellinger ........... H04N 5/23206 715/835 |
| 2013/0007665 | A1* | 1/2013 | Chaudhri .............. G06F 9/4443 715/830 |
| 2013/0053105 | A1* | 2/2013 | Lee ....................... H04M 1/673 455/565 |

(Continued)

FOREIGN PATENT DOCUMENTS

| CN | 102004600 A | 4/2011 |
| CN | 102402381 A | 4/2011 |
| CN | 102402381 A | 4/2012 |

*Primary Examiner* — Omar Abdul-Ali
(74) *Attorney, Agent, or Firm* — Birch, Stewart, Kolasch & Birch, LLP

(57) ABSTRACT

A mobile terminal including a terminal body; a display unit configured to display a lock screen including a plurality of regions in a lock mode in which an input of a control command with respect to an application is limited; and a controller configured to, when a touch input applied to a region among the plurality of regions of the lock screen to release the lock mode is sensed, detect information regarding a home screen corresponding to the touched region, and display the home screen corresponding to the touched region based on the detected information regarding the home screen corresponding to the touched region on the display unit.

18 Claims, 21 Drawing Sheets

(56) References Cited

U.S. PATENT DOCUMENTS

| | | | | |
|---|---|---|---|---|
| 2013/0086522 A1* | 4/2013 | Shimazu | ............. | G06F 3/04817 |
| | | | | 715/810 |
| 2014/0068755 A1* | 3/2014 | King | ...................... | G06F 21/53 |
| | | | | 726/19 |

* cited by examiner

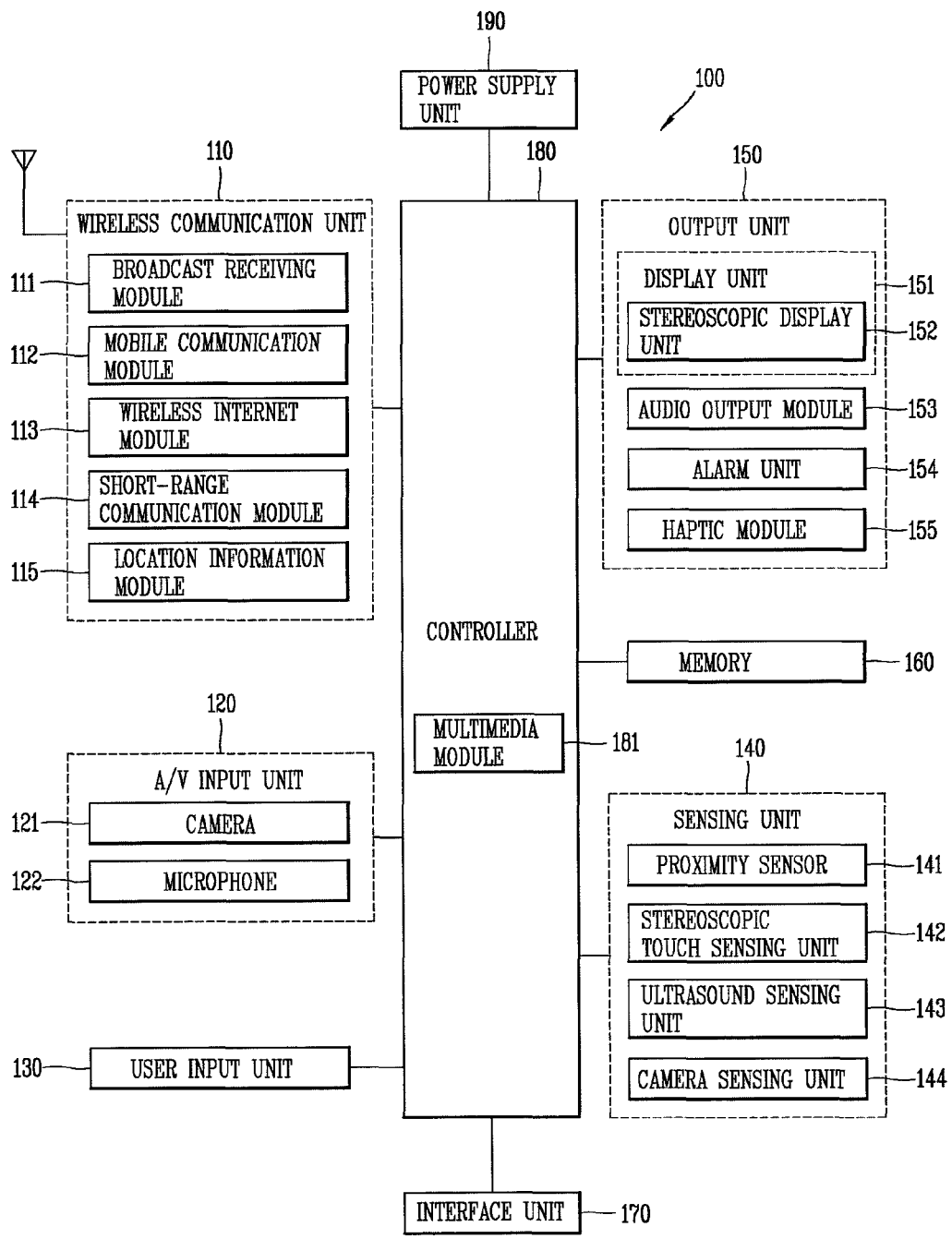

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2013-0028263, filed on Mar. 15, 2013, the contents of which is incorporated by reference herein in its entirety.

BACKGROUND OF THE INVENTION

Field of the Invention

The present invention relates to a mobile terminal and, more particularly, to a mobile terminal capable of displaying screen information, and a control method thereof.

Description of the Related Art

In general, terminals include different types such as mobile terminals and stationary terminals. In addition, mobile terminals include different types such as handheld terminals and vehicle mounted terminals.

As functions of mobile terminals become more diversified, mobile terminals can support more complicated functions such as capturing images or video, reproducing music or video files, playing games, receiving broadcast signals, and the like. By comprehensively and collectively implementing such functions, mobile terminals may be embodied in the form of a multimedia player or device. Efforts are ongoing to support and increase the functionality of mobile terminals. Such efforts include software and hardware improvements, as well as changes and improvements in structural components of mobile terminals.

To prevent a user's unintentional touch input, mobile terminals may execute a lock mode in which a user input is limited. Also, a pre-set lock screen may be displayed in the lock mode. Mobile terminals may release the lock mode on the basis of a touch input applied to the lock screen, and display a home screen. However, in mobile terminals in related art, only a pre-set single home screen is displayed. Also, in the mobile terminals in related art, a home screen optimized for a user situation among a plurality of pre-set home screens is not displayed.

SUMMARY OF THE INVENTION

An aspect of the present invention provides a mobile terminal capable of enhancing user convenience in releasing a lock mode and displaying a home screen, and a control method thereof.

To achieve these and other advantages and in accordance with the purpose of the present invention, as embodied and broadly described herein, the present invention provides an embodiment of a mobile terminal, the mobile terminal including, for example, a terminal body; a display unit configured to display a lock screen including a plurality of regions in a lock mode in which an input of a control command with respect to an application is limited; and a controller configured to, when a touch input applied to any one of the plurality of regions of the lock screen in order to release the lock mode is sensed, detect information regarding a home screen corresponding to the touched region and display a home screen on the basis of the detected information regarding a home screen on the display unit.

In an embodiment of the present invention, the mobile terminal includes when a touch input applied to any one of the plurality of regions of the lock screen is sensed, the controller being further configured to display information related to the touched region on the display unit for a pre-set period of time, and when the pre-set period of time has passed, release the lock mode and display a home screen on the basis of the detected information regarding the home screen.

In an embodiment of the present invention, the mobile terminal includes the information related to the touched region including detailed information related to the information which has been displayed in the touched region in the lock screen.

In an embodiment of the present invention, the mobile terminal includes when a touch input applied to any one of the plurality of regions of the lock screen is sensed, the controller being further configured to detect information regarding a setting of the body corresponding to the touched region and change the setting of the body on the basis of the detected setting information.

In an embodiment of the present invention, the mobile terminal includes the controller being further configured to set at least one of a password and a touch pattern to be received for releasing the lock mode differently in each of the plurality of regions.

In an embodiment of the present invention, the mobile terminal includes a user input unit configured to receive a control command for releasing a sleep mode. When the control command for releasing the sleep mode is received through the user input unit, the display unit may display the lock screen including the plurality of regions, and the controller may detect information regarding the home screen which has been displayed before entering the sleep mode, and display a region corresponding to the detected information regarding the home screen among the plurality of regions in a highlighted manner.

In an embodiment of the present invention, the mobile terminal includes when an event occurs, the display unit being further configured to display notification information regarding the generated event on the lock screen, and the controller being further configured to determine in which region among the plurality of regions of the lock screen the notification information regarding the generated event is to be displayed, on the basis of information regarding an attribute of the generated event.

In an embodiment of the present invention, the mobile terminal includes when a touch input applied to the notification information regarding the generated event is sensed, the controller being further configured to detect information regarding an attribute of the sensed touch input, and selectively execute any one of a function of displaying detailed information regarding the generated event and a function of executing a module related to the generated event, on the basis of the detected attribute information.

In an embodiment of the present invention, the mobile terminal includes the display unit may display schedule information in any one of the plurality of regions, and the controller being further configured to change a size of the region in which the schedule information is displayed, on the basis of time information included in the schedule information and current time information.

In an embodiment of the present invention, the mobile terminal includes a sensing unit configured to sense a tilt of the body, the controller being further configured to change a proportion of each of the plurality of regions in the lock screen on the basis of the tilt of the body.

In an embodiment of the present invention, the mobile terminal includes while changing the proportion of each of the plurality of regions, the controller being further configured to change an amount of information displayed in each of the plurality of regions.

In an embodiment of the present invention, the mobile terminal includes when the tilt of the body corresponds to a pre-set tilt, the display unit being further configured to display only any one of the plurality of regions, and when a touch input applied to the any one region is sensed to release the lock mode, the controller may detect information regarding a home screen corresponding to the any one region, and display a home screen on the basis of the detected information regarding the home screen.

In an embodiment of the present invention, the display unit may display at least one widget on the lock screen, and when at least one of the at least one widget displayed on the lock screen is selected, the controller may display detailed information related to the selected widget on the lock screen.

In an embodiment of the present invention, the display unit may display a bar dividing the plurality of regions in the lock screen, and the controller may set a timer function on the basis of a touch input applied to the bar.

In an embodiment of the present invention, the mobile terminal may further include a wireless communication unit configured to collect at least one of information regarding a position of the body and time information, the controller being further configured to change information displayed in the plurality of regions of the lock screen on the basis of at least one of the position information and time information.

To achieve these and other advantages and in accordance with the purpose of the present invention, as embodied and broadly described herein, the present invention provides an embodiment of a method for controlling a mobile terminal, the method including displaying a lock screen including a plurality of regions in a lock mode in which an input of a control command with respect to an application is limited; sensing a touch input applied to any one of the plurality of regions of the lock screen to release the lock mode; detecting information regarding a home screen corresponding to the touched region; and displaying a home screen on the basis of the detected information regarding a home screen on the display unit.

In an embodiment of the present invention, the displaying of a home screen on the basis of the detected information regarding a home screen on the display unit may include when a touch input applied to any one of the plurality of regions of the lock screen is sensed, displaying information related to the touched region on the display unit for a pre-set period of time; and when the pre-set period of time has passed, releasing the lock mode and displaying a home screen on the basis of the detected information regarding a home screen on the display unit.

In an embodiment of the present invention, the method may further include sensing a tilt of a terminal body; and changing a proportion of each of the plurality of regions in the lock screen, on the basis of the tilt of the body.

The scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art.

BRIEF DESCRIPTION OF THE DRAWINGS

The present invention will become more fully understood from the detailed description given hereinbelow and the accompanying drawings, which are given by illustration only, and thus are not intended to limit the scope of the present invention.

FIG. 1 is a block diagram of a mobile terminal according to an embodiment of the present invention.

DETAILED DESCRIPTION OF THE INVENTION

Figure 2A:
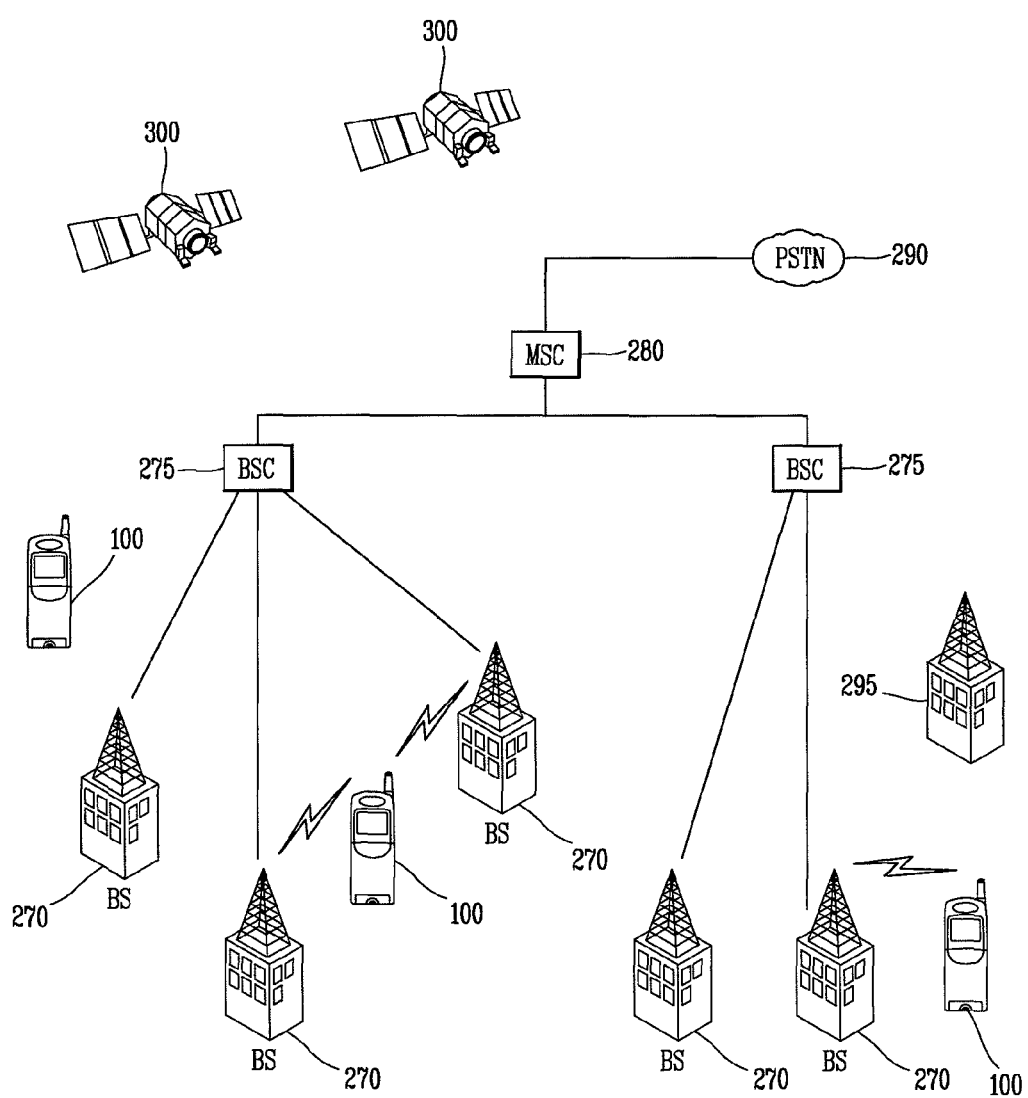
FIGS. 2A and 2B are conceptual views of communication systems in which the mobile terminal according to an embodiment of the present invention is operable.

The embodiments of the present invention will now be described with reference to the accompanying drawings, in which like numbers refer to like elements throughout although the embodiments are different, and a description of the like elements according to a first embodiment will be used for those of different embodiments. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and it should be understood that the present invention is not limited by the accompanying drawings.

Mobile terminals described herein may include, for example, mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it may be easily understood by a person skilled in the art that the configuration according to embodiments of the present invention can be also applicable to fixed types of terminals such as digital TVs, desk top computers, and the like.

FIG. 1 is a block diagram of a mobile terminal according to an embodiment of the present invention.

As illustrated in FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. Although FIG. 1 shows the mobile terminal as having various components, it should be understood that implementing all of the illustrated components in the mobile terminal is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal.

The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System) or a Wi-Fi (Wireless Fidelity) module.

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress)

noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, a haptic module 155, and the like.

The display unit 151 displays (outputs) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

In addition, the display unit 151 is configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Also, the display unit 151 may be configured as a stereoscopic display unit 152 displaying a stereoscopic image. The stereoscopic image is a three-dimensional (3D) stereoscopic image, and the 3D stereoscopic image is an image making a viewer feel that a gradual depth and reality of an object on a monitor or a screen is the same as a reality space. A 3D stereoscopic image is implemented by using binocular disparity. Binocular disparity refers to disparity made by positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly the generated left image thumbnail and the generated right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In a case where the touch screen is the capacitance type proximity sensor, a proximity of the pointer is detected by a change in an electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

When a touch sensor is overlaid on the stereoscopic display unit 152 in a layered manner, or when the stereoscopic display unit and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144. The proximity sensor 141 detects the distance between a sensing object (e.g., the user's finger or a stylus) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 senses pressure applied by the touch, and if the applied pressure is strong, the stereoscopic touch sensing unit 142 recognizes the touch as a touch with respect to an object positioned to be farther from the touch screen toward the interior of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light, and the ultrasonic sensors may be configured to sense ultrasonic waves. Since light travels much faster than ultrasonic waves, light reaches the optical sensor much earlier than ultrasonic waves reaching the ultrasonic sensors. Thus, based on light as a reference signal, a position of a wave generation source may be calculated by using a time difference between a time at which light reaches the optical sensor and a time at which ultrasonic waves reach the ultrasonic sensors.

The camera sensing unit 144 includes at least one of a camera, a photo sensor, and a laser sensor. For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtains position information of the sensing object.

The audio output module 153 converts and outputs sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, or other sound generating device.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, to inform about an occurrence of an event. The video or audio signals may also be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact via an electrode, electrostatic force, etc., and an effect by reproducing the sense of cold and warmth using an element that can absorb or generate heat.

The haptic module 155 may be implemented to allow the user to feel a tactile effect through a muscle sensation such as fingers or an arm of the user, and transfer the tactile effect through a direct contact. Two or more haptic modules 155 may be provided according to the configuration of the mobile terminal 100.

The memory 160 stores software programs used for the processing and controlling operations performed by the controller 180, or may temporarily store data (e.g., a phonebook, messages, still images, video, etc.) being input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with any or all external devices connected with the mobile terminal 100. For example, the external devices may transmit data to another external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (hereinafter identifying device) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be positioned within the controller 180 or may be configured to be separated from the controller 180.

The controller 180 may perform a pattern recognition processing to recognize a handwriting input or a picture drawing input performed on the touch screen as characters or images, respectively. Also, when a state of the mobile terminal satisfies pre-set conditions, the controller 180 may execute a locked state for limiting an input of a control command of the user. Also, in the locked state, the controller 180 may control a locked screen displayed in the locked state on the basis of a touch input sensed through the display unit 151. The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a communication system implementable through the mobile terminal 100 according to an embodiment of the present invention will be described. In particular, FIGS. 2A and 2B are conceptual views of communication systems in which the mobile terminal 100 according to another embodiment of the present invention is operable.

Figure 2B:
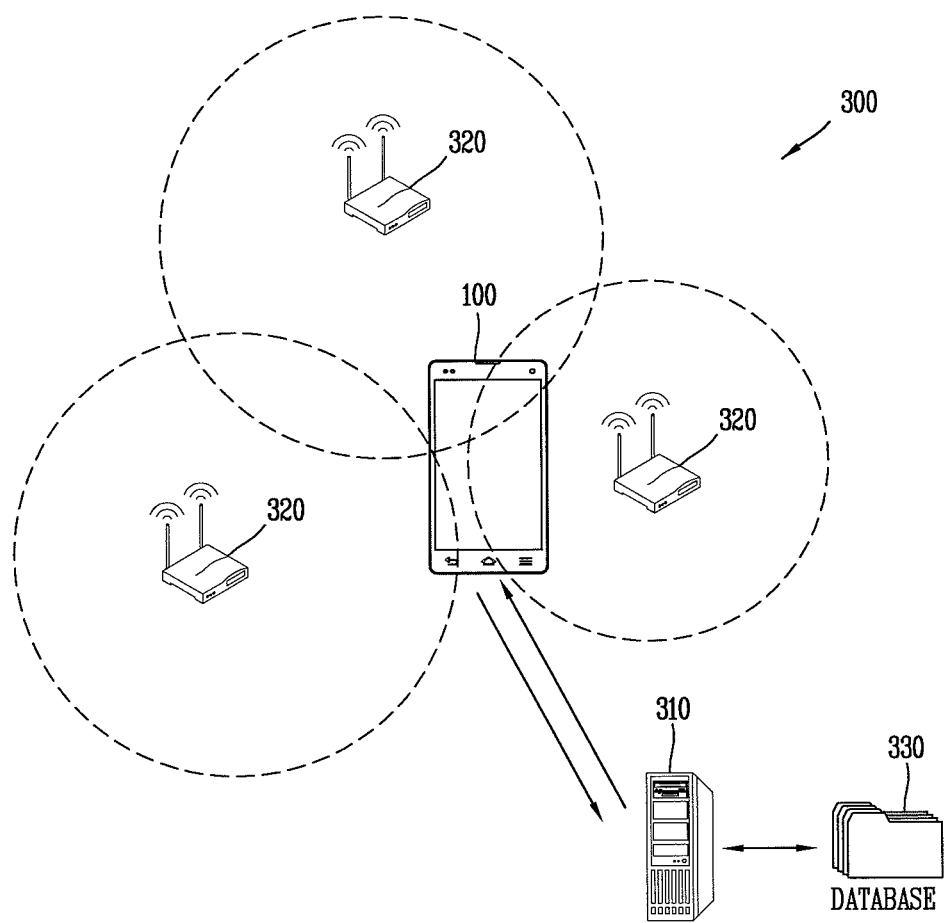

First, referring to FIG. 2A, a communication system may use different air interfaces and/or physical layers. For example, air interfaces utilized by the communication systems include frequency division multiple access (FDMA), time division multiple access (TDMA), code division multiple access (CDMA), and universal mobile telecommunications system (UMTS) (e.g., long term evolution (LTE)), global system for mobile communications (GSM), and the like). As a non-limiting example, the description hereafter relates to a CDMA communication system, but such teachings apply equally to other types of systems.

Hereinafter, for the description purpose, CDMA will be described, but, obviously, the present invention is applicable to any communication system including a CDMA wireless communication system.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc.).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2A, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

Also, in FIG. 2A, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within the particular BS 270. The resulting data is forwarded to an associated BSC 275. The BSC 275 provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Next, a method of acquiring the location information of a mobile terminal using a Wi-Fi (Wireless Fidelity) positioning system (WPS) will be described with reference to FIG. 2B.

The Wi-Fi positioning system (WPS) 300 refers to a location determination technology based on a wireless local area network (WLAN) using Wi-Fi as a technology for tracking the location of the mobile terminal 100 using a Wi-Fi module provided in the mobile terminal 100 and a wireless access point 320 for transmitting and receiving to and from the Wi-Fi module.

The Wi-Fi positioning system 300 may include a Wi-Fi location determination server 310, a mobile terminal 100, a wireless access point (AP) 320 connected to the mobile terminal 100, and a database 330 stored with any wireless AP information. The Wi-Fi location determination server 310 extracts the information of the wireless AP 320 connected to the mobile terminal 100 based on a location information request message (or signal) of the mobile terminal 100. The information of the wireless AP 320 may be transmitted to the Wi-Fi location determination server 310 through the mobile terminal 100 or transmitted to the Wi-Fi location determination server 310 from the wireless AP 320. The information of the wireless AP extracted based on the location information request message of the mobile terminal 100 may be at least one of a MAC address, an SSID, an RSSI, channel information, privacy, network type, signal strength and noise strength.

The Wi-Fi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the Wi-Fi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as a MAC address, an SSID, an RSSI, channel information, privacy, network type, latitude and longitude coordinate, a building at which the wireless AP is located, a floor number, detailed indoor location information (GPS coordinate available), an AP owner's address, a phone number, and the like.

In this manner, wireless AP information and location information corresponding to the any wireless AP may be stored together in the database 330, and thus the Wi-Fi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the Wi-Fi location determination server 310, thereby acquiring the location information of the mobile terminal 100.

Figure 3A:
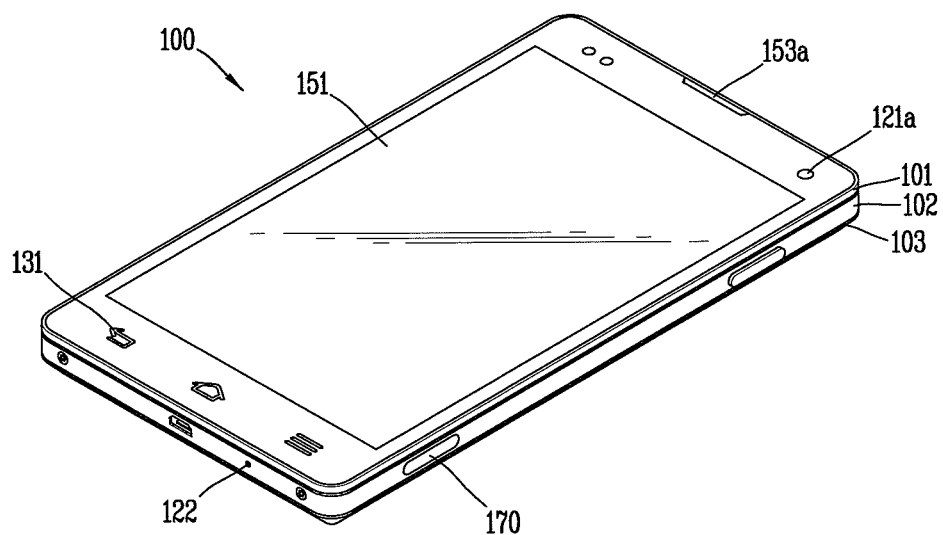
FIG. 3A is a front perspective view of the mobile terminal according to an embodiment of the present invention.

Next, FIG. 3A is a front perspective view illustrating another embodiment of the mobile terminal 100 according to the present invention.

The mobile terminal 100 disclosed herein is provided with a bar-type terminal body. However, the present invention is not limited to this, but is also applicable to various structures such as a watch type, a clip type, a glasses type or a folder type, a flip type, a swing type, a swivel type, or the like, in which two and more bodies are combined with each other in a relatively movable manner.

The terminal body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing means may be configured to sense this touch and enter the content corresponding to the touched place. The content may be entered by a touch method and may be a text or numerical value, or a menu item capable of indication or designation in various modes.

The touch sensing mechanism may be formed with transparency to allow visual information displayed on the display unit 151 to be seen, and includes a structure for enhancing the visibility of a touch screen at bright places. Referring to FIG. 3A, the display unit 151 occupies a most portion of the front surface of the front case 101.

The first audio output module 153a and the first camera 121a are disposed in a region adjacent to one of both ends of the display unit 151, and the first manipulation input unit 131 and the microphone 122 are disposed in a region adjacent to the other end thereof. The second manipulation unit 132 (refer to FIG. 3B), the interface 170, and the like, may be disposed on a lateral surface of the terminal body.

The first audio output module 153a may be implemented in the form of a receiver for transferring voice sounds to the user's ear or a loud speaker for outputting various alarm sounds or multimedia reproduction sounds. It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention is not be limited to this, but a hole for releasing the sounds may be formed on the window.

The first camera 121a processes video frames such as still or moving images obtained by the image sensor in a video call mode or capture mode. The processed video frames may be displayed on the display unit 151.

In addition, the user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as a touch, a push, a scroll, or the like.

In the present drawing, the first manipulation unit 131 may be a touch key, but the present disclosure is not necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as a menu command, a home key command, a cancel command, a search command, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or a User Identity Module (UIM), and a memory card for information storage.

Figure 3B:
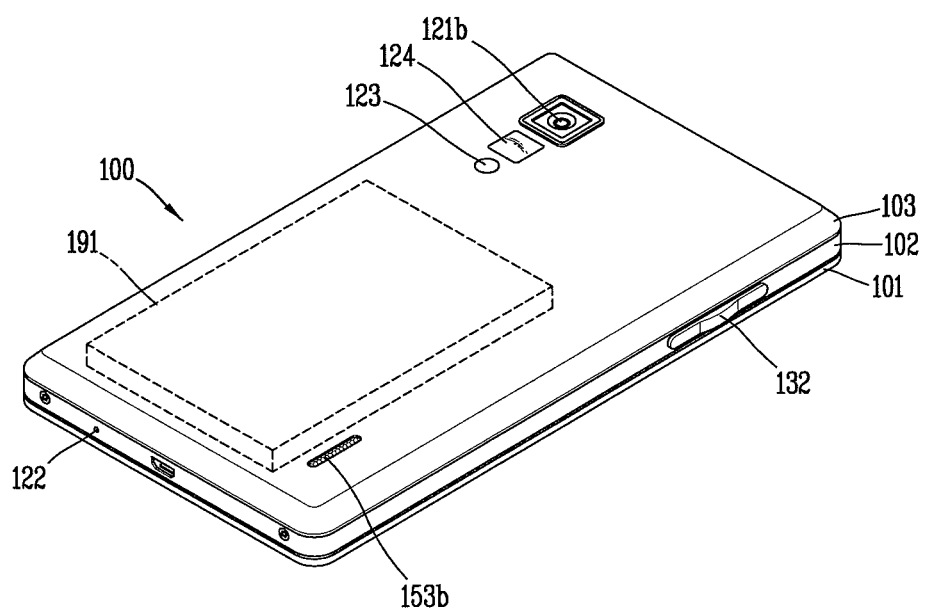
FIG. 3B is a rear perspective view of the mobile terminal illustrated in FIG. 3A.

Next, FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough to not cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and pop-up manner.

A flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output module 153b may be additionally disposed at a rear surface of the terminal body. The second audio output module 153b together with the first audio output module 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. The drawing illustrates the battery cover 103 combined with the rear case 102 to cover the battery 191, thereby restricting the battery 191 from being released and protecting the battery 191 from external shocks and foreign substances.

Meanwhile, in order to prevent a user's unintentional touch input, a lock mode in which a user input is limited may be executed in a mobile terminal. Also, a pre-set lock screen may be displayed in the lock mode of the mobile terminal. The mobile terminal may release the lock mode on the basis of a touch input applied to the lock screen, and display a home screen. However, in mobile terminals in related art, only a pre-set single home screen is displayed. Also, in the mobile terminals in related art, a home screen optimized for a user situation among a plurality of pre-set home screens is not displayed.

Accordingly, the mobile terminal 100 for enhancing user convenience by releasing a lock mode and displaying a home screen, and a control method thereof, are described below with reference to the accompanying drawings.

Figure 4:
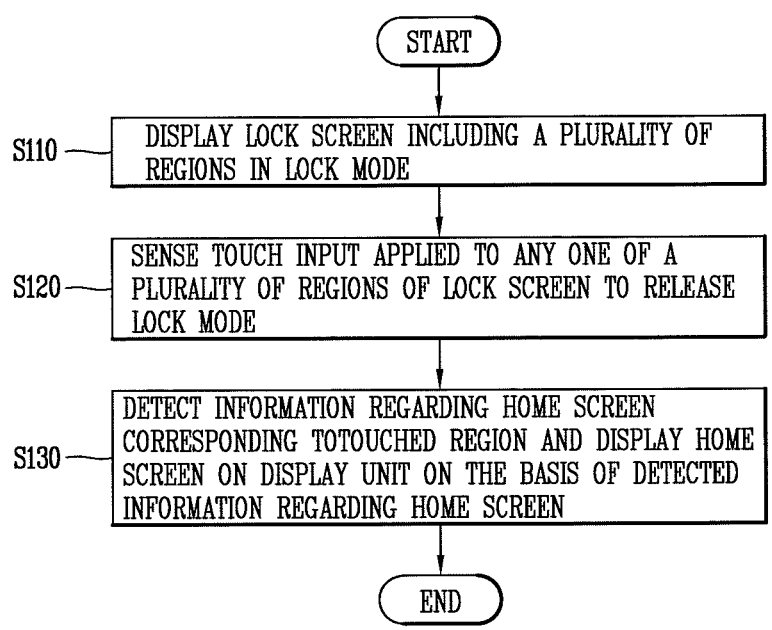
FIG. 4 is a flow chart illustrating a process of a control method of the mobile terminal according to an embodiment of the present invention.

Next, FIG. 4 is a flow chart illustrating a control method of the mobile terminal 100 according to another embodiment of the present invention. Referring to FIG. 4, a lock screen including a plurality of regions is displayed in a lock mode (S110). In detail, when the mobile terminal 100 is in a sleep mode, the user input unit 130 may receive a control command for releasing the sleep mode. Here, the sleep mode may refer to a mode in which screen information is not displayed on the display unit 151 and a touch input applied to the display unit 151 is not sensed.

When the control command for releasing the sleep mode is received through the user input unit 130, the controller 180 may display a lock screen on the display unit 151.

In general, the lock mode of the mobile terminal 100 refers to an operation mode in which a user input such as a touch input applied to the display unit 151 is limited. Such a lock mode may be released on the basis of a limited user input.

In the lock mode, a lock screen may be displayed on the display unit 151. Here, the lock screen may refer to a screen in which displaying of a particular screen (e.g., an idle screen, a home screen, or the like) or a particular image is prevented or limited. The lock screen may include a window for receiving a password or a window for receiving a particular pattern, for example.

Thereafter, a touch input applied to any one of the plurality of regions of the lock screen to release the lock mode is sensed (S120).

The lock screen may include a plurality of regions. When the touch input is applied to the lock screen, the memory 160 may store the touch input, and the sensing unit 140 (refer to FIG. 1) may sense a region to which the touch input has been applied, among the plurality of regions.

Thereafter, information regarding a home screen corresponding to the touched region is detected, and a home screen on the basis of the detected information regarding a home screen is displayed on the display unit 151 (S130).

The memory 160 (refer to FIG. 1) may store information regarding home screens corresponding to the plurality of regions of the lock screen, respectively. Here, the information regarding a home screen, i.e., information regarding a template of a home screen, may include at least one of information regarding a background image of a home screen, information regarding a type of an object included in a home screen, and information regarding a disposition of an object included in a home screen.

Information regarding a home screen information may be set by a user or by the controller 180. For example, the controller 180 may set information regarding a home screen on the basis of usage pattern information of the user, and the like.

The controller 180 may detect information regarding a home screen corresponding to the touch input stored in the memory 160. The controller 180 may release the lock mode and display a home screen on the basis of the information regarding a home screen on the display unit 151.

Meanwhile, although not shown, the controller 180 may display information regarding the touched region in the lock screen on the display unit 151 for a pre-set period of time, before displaying the home screen on the display unit 151. Here, the information regarding the touched region may include detailed information related to the information which has been displayed in the touched region in the lock screen. Thereafter, when a pre-set period of time has passed, the controller 180 may make the detailed information disappear from the display unit 151, and display the home screen on the basis of the detected information regarding a home screen on the display unit 151.

Also, although not shown, before displaying the home screen on the display unit 151, the controller 180 may display a background image displayed in the touched region of the lock screen in the entire region of the display unit 151 for a pre-set period of time. Thereafter, when the pre-set period of time has passed, the controller 180 may display the home screen on the basis of the detected information regarding a home screen on the display unit 151.

As described above, according to an embodiment of the present invention, different home screens may be displayed according to a point to which a touch input is applied in the lock screen. Namely, the user may determine a home screen to be displayed on the display unit 151 on the basis of a touch input applied to the lock screen. Thus, the user may select any one of a plurality of home screens according to various situations. As a result, user convenience can be enhanced.

Figure 5:
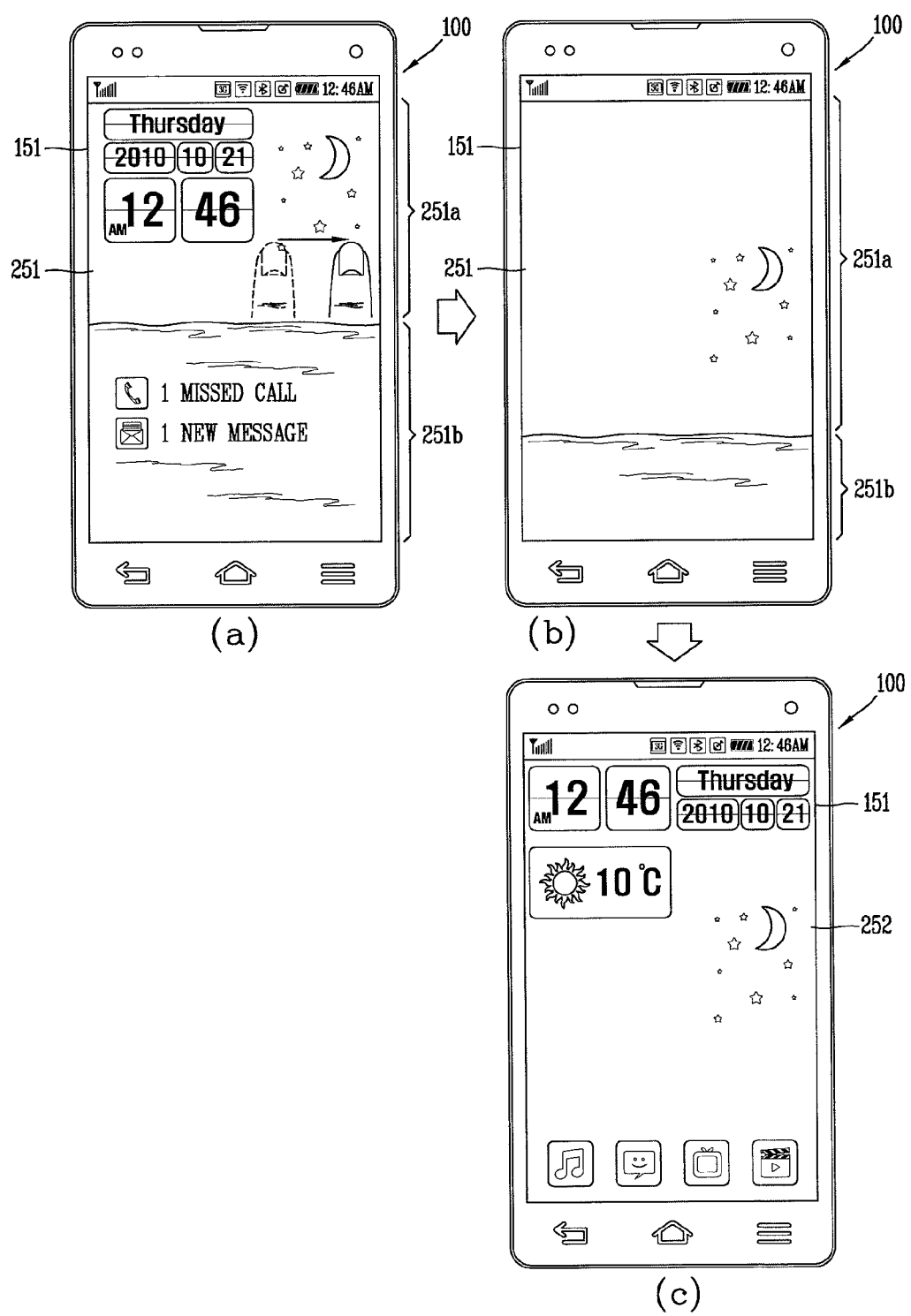
FIGS. 5 through 7 are display screens illustrating other embodiments of the present invention including home screens displayed on the basis of a touch input applied to a lock screen.
Figure 6:
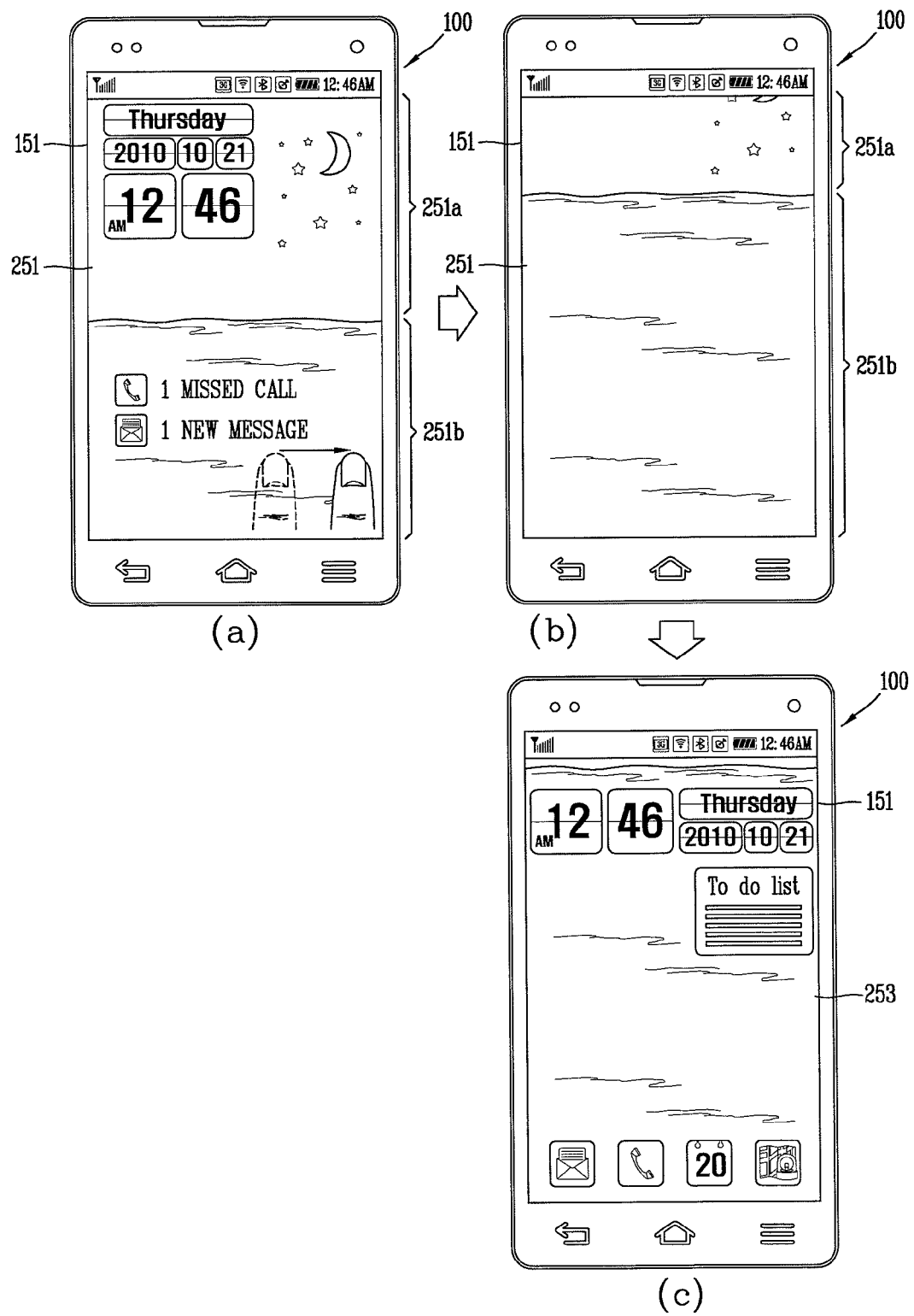
Figure 7:
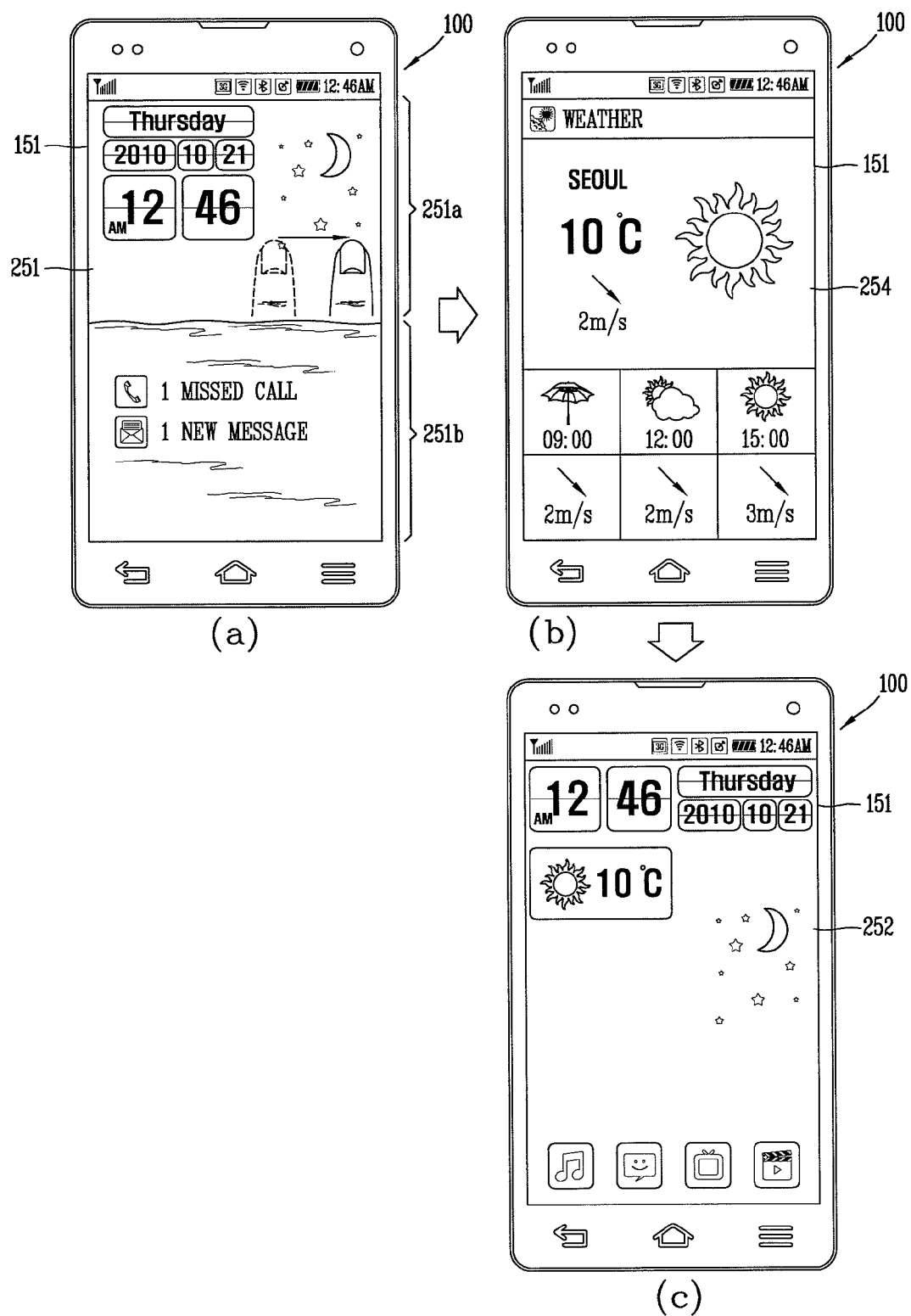

Next, FIGS. 5 through 7 are conceptual views illustrating other embodiments of the present invention including home screens 252 and 353 displayed on the basis of a touch input applied to a lock screen 251. Referring to (a) of FIG. 5 and (a) of FIG. 6, when the mobile terminal 100 is in a sleep mode and a control command for releasing the sleep mode is received through the user input unit 130, the controller 180 may release the sleep mode. As the sleep mode is released, the controller 180 may display the lock screen 251 on the display unit 151. As illustrated in (a) of FIG. 5 and (a) of FIG. 6, the lock screen 251 may include a plurality of regions, including first and second regions 251*a* and 251*b*.

In the lock screen 251, a size of each of the first and second regions 251*a* and 251*b* may be adjusted by the user's touch input. For example, sizes of the first and second regions 251*a* and 251*b* may be adjusted on the basis of a drag input with respect to a bar dividing the first and second regions 251*a* and 251*b*.

Although not shown, a window for receiving a password or a window for receiving a particular pattern may be displayed in each of the first and second regions 251*a* and 251*b* of the lock screen 251. Here, the password and the particular pattern to be received in the first and second regions 251*a* and 251*b* to release the lock mode may be set to be different. Also, to release the lock mode, the first and second regions 251*a* and 251*b* may be configured so that only one of the first and second regions 251*a* and 251*b* receives the password and the particular pattern.

Information may be displayed in the first and second regions 251*a* and 251*b* of the lock screen 251. Displayed information may be information set by the user or may be information set by the controller 180. For example, as illustrated, information regarding a current time may be displayed in the first region 251*a* of the lock screen 251, and information regarding a generated event may be displayed in the second region 251*b*.

Here, when a touch input applied to the first region 251*a* to release the lock mode is sensed, as illustrated in (b) of FIG. 5, the controller 180, providing an effect of shadowing the screen, may display an image related to a background image which has been displayed in the first region 251*a* for a pre-set period of time on the display unit 151. Here, the controller 180 may provide an effect of increasing the size of the first region 251*a*. Meanwhile, this process may be omitted.

Thereafter, as illustrated in (c) of FIG. 5, the controller 180 may display a home screen (hereinafter a first home screen) 252 corresponding to the first region 251*a* on the display unit 151. Here, a background image of the first home screen 252 may be an image related to the background image which has been displayed in the first region 251*a* of the lock screen 251.

Meanwhile, although not shown, the mobile terminal 100 may enter a sleep mode on the basis of an input applied to the user input unit 130. In a state in which the first home screen 252 is displayed, when an input for entering the sleep mode is applied to the user input unit 130, the controller 180 may provide a pre-set effect (e.g., shimmering) to the first home screen 252 and enter the sleep mode. After entering the sleep mode, the controller 180 may display pre-set graphic data (e.g., an object indicating information regarding a current time) on the display unit 151.

Meanwhile, in a case in which a touch input applied to the second region 251*b* of the lock screen 251 to release the lock mode is sensed, as illustrated in (b) of FIG. 6, the controller 180 may display the image related to the background image which has been displayed in the second region 251 for a pre-set period of time on the display unit 151.

Thereafter, as illustrated in (c) of FIG. 6, the controller 180 may display a home screen (hereinafter a second home screen) 253 corresponding to the second region 251*b* on the display unit 151. Here, a background image of the second home screen 253 may be an image related to the background image which has been displayed in the second region 251*b* of the lock screen 251.

Meanwhile, as illustrated in (c) of FIG. 5 and the second home screen 253 illustrated in (c) of FIG. 6 may have different types of home screen template information, and thus, information regarding a background image of the home screens, information regarding a type of an object included in the home screens, and information regarding a disposition of an object included in the home screens may be different.

Meanwhile, the first home screen 252 and the second home screen 253 may have different background image information and include the same object.

Also, a background image displayed on the lock screen 251 may be changed on the basis of at least one of current time information and current position information. Similarly, a background image of the first home screen 252 and the second home screen 253 may be changed on the basis of at least one of the current time information and current position information. For example, as time and days pass, a shape of an object of moon included in the background image may be changed.

Meanwhile, referring to (a) through (c) of FIG. 7, when a touch input applied to any one (e.g., the first region 251*a*) of the first and second regions 251*a* and 251*b* of the lock screen 251 is sensed, the controller 180 may display information related to the first region 251*a* on the display unit 151 for a pre-set period of time.

For example, the controller 180 may display weather information 254 as information related to the first region 251*a* on the display unit 151 for a pre-set period of time.

Thereafter, when a pre-set period of time has passed, the controller 180 may release the lock mode, making the weather information 254 disappear from the display unit 151, and display the first home screen 252 on the display unit 151.

Figure 8:
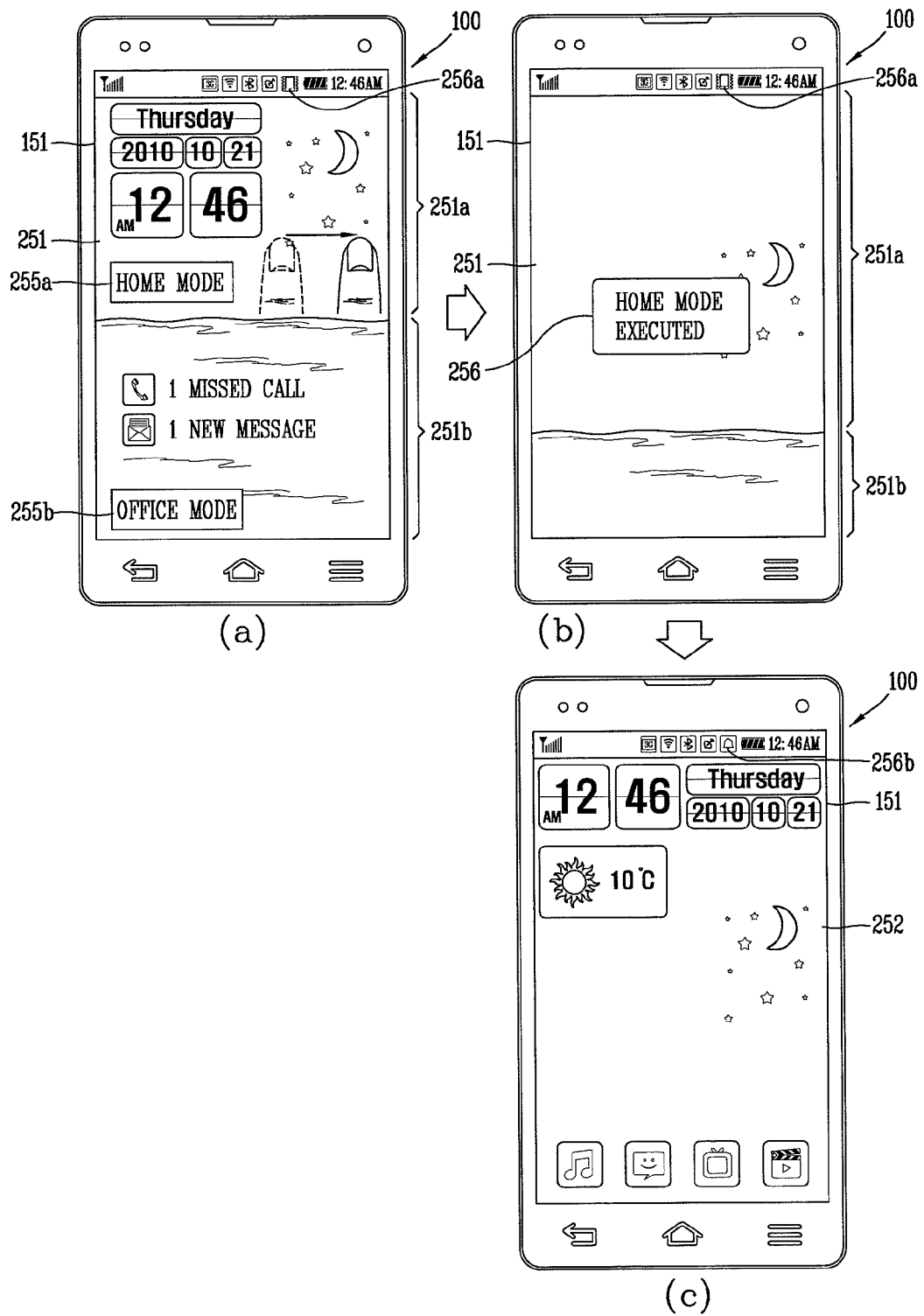
FIG. 8 is a display screen illustrating another embodiment of the present invention in which a setting of a body is changed on the basis of a touch input applied to a lock screen on the mobile terminal.

Next, FIG. 8 is a conceptual view illustrating another embodiment of the present invention in which a setting of a body of the mobile terminal 100 is changed on the basis of a touch input applied to the lock screen.

Referring to (a) of FIG. 8, the lock screen 51 may include the first and second regions 251*a* and 251*b*. According to a touch input applied to any one of the first and second regions 251*a* and 251*b* to release a lock mode, the controller 180 may execute a corresponding mode (or a different mode). For example, as illustrated in (a) of FIG. 8, an object 255*a* indicating that the first region 251*a* of the lock screen 251 is a region related to a 'home mode' may be displayed in the first region 251*a*. Also, an object 255*b* indicating that the second region 251*b* is a region related to an 'office mode' may be displayed in the second region 251*b*.

Here, when a touch input applied to any one (e.g., the first region 251*a*) of the first and second regions 251*a* and 251*b* is sensed, as illustrated in (b) of FIG. 8, the controller 180 may display an image related to a background image which has been displayed in the first region 251*a* on the display unit 151 for a pre-set period of time. In this case, the controller 180 may provide an effect of increasing a size of the first region 251*a*. Also, the controller 180 may display a pop-up window 256 indicating execution of the home mode on the display unit 151 for a pre-set period of time.

Thereafter, when a pre-set period of time has passed, as illustrated in (c) of FIG. 8, the controller 180 may execute the home mode. In detail, the controller 180 may display the home screen 252 corresponding to the home mode on the display unit 151. Also, the controller 180 may change a setting of the body. For example, the controller 180 may change a vibration mode to a bell sound mode. Accordingly, an object 256*a* indicating the vibration mode displayed in a status bar of the display unit 151 may be changed into an object 256*b* indicating the bell sound mode.

Figure 9:
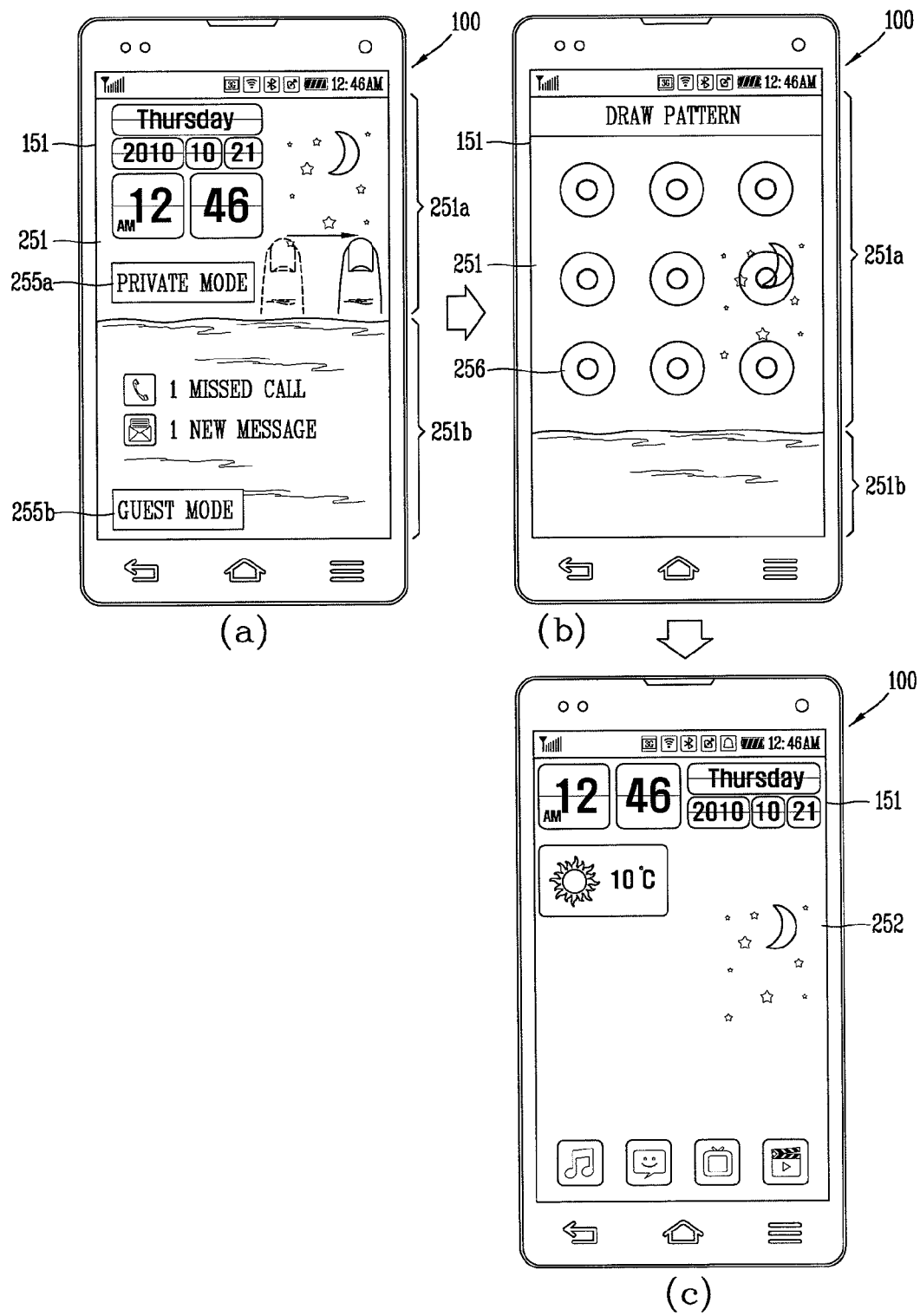
FIGS. 9 and 10 are display screens illustrating other embodiments of the present invention in which a touch pattern input to release a lock mode is set differently in each of a plurality of regions of a lock screen.
Figure 10:
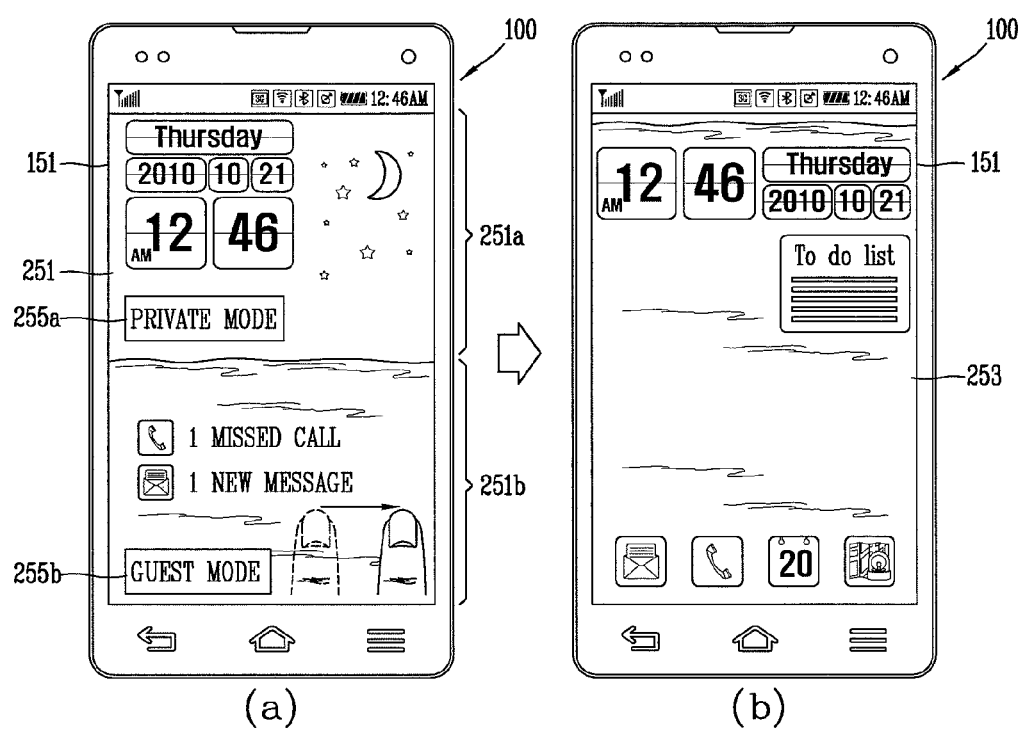

Next, FIGS. 9 and 10 are conceptual views illustrating other embodiments of the present invention in which a touch pattern input to release a lock mode is set differently in each of a plurality of regions of the lock screen 251.

Referring to (a) of FIG. 9 and (a) of FIG. 10, according to a touch input applied to any of the first and second regions 251*a* and 251*b* of the lock screen 251, the controller 180 may execute a corresponding mode (or a different mode). For example, as illustrated in (a) of FIG. 9 and (a) of FIG. 10, an object 255*a* indicating that the first region 251*a* is a region related to a 'private mode' may be displayed in the first region 251*a*. Also, an object 255*b* indicating that the second region 251*b* is a region related to a 'guest mode' may be displayed in the second region 251*b*.

Here, when a touch input applied to any one (e.g., the first region 251*a*) of the first and second regions 251*a* and 251*b* is sensed, as illustrated in (b) of FIG. 9, the controller 180 may display a window 256 for receiving a particular pattern to release the lock mode. Here, an image related to a background image which has been displayed in the first region 251a may be used as a background image of the window 256. Meanwhile, although not shown, the controller 180 may display a window for receiving a password.

Thereafter, when a pre-set particular pattern is input, as illustrated in (c) of FIG. 9, the controller 180 may release the lock mode and display the home screen 252 corresponding to the privacy mode on the display unit 151. Although not shown, the controller 180 may detect information regarding a setting of the body corresponding to the privacy mode and change the setting of the body on the basis of the detected setting information.

Meanwhile, when a touch input applied to the other (e.g., the second region 251b) of the first and second regions 251a and 251b is sensed, as illustrated in (b) of FIG. 10, the controller 180 may immediately release the lock mode and display the home screen 253 corresponding to the guest mode on the display unit 151.

Although not shown, the controller may detect information regarding a setting of the body corresponding to the guest mode and change the setting of the body on the basis of the detected setting information. For example, while executing the guest mode, the controller 180 may interrupt an access to a text message application or an e-mail application.

Figure 11:
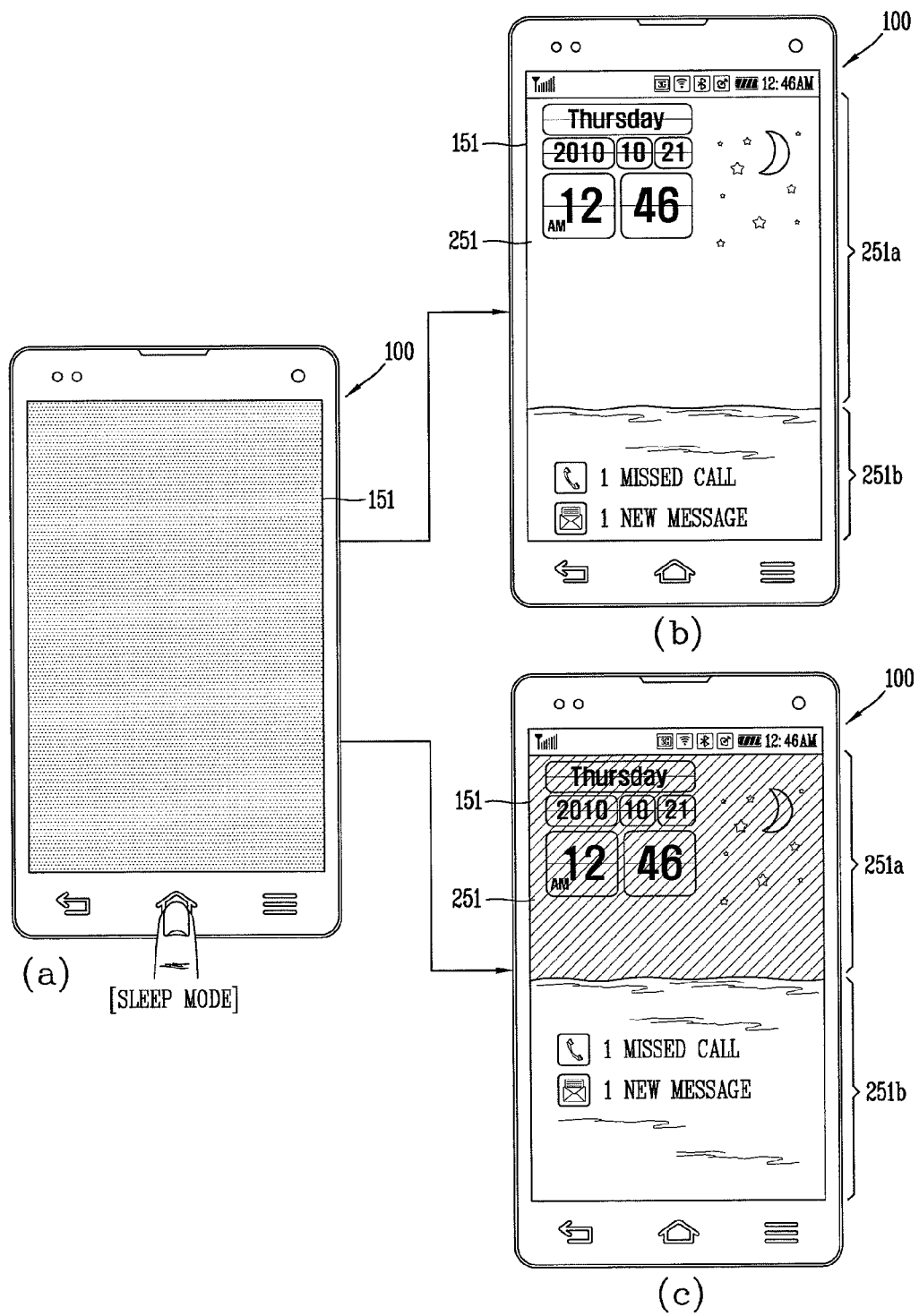
FIG. 11 is a display screen illustrating another embodiment of the present invention in which a lock screen is displayed after a sleep mode is released.

Next, FIG. 11 is a conceptual view illustrating another embodiment of the present invention in which a lock screen is displayed after a sleep mode is released. Referring to (a) of FIG. 11, when the mobile terminal 100 is in a sleep mode, the user input unit 130 may receive a control command for releasing the sleep mode. Here, the sleep mode refers to a mode in which screen information is not displayed on the display unit 151 and a touch input applied to the display unit 151 is not sensed.

When the control command for releasing the sleep mode is received through the user input unit 130, the controller 180 may display the lock screen 251 on the display unit 151.

Meanwhile, the controller 180 may detect information regarding a home screen which has been displayed before the entry of the sleep. In displaying the lock screen 251 on the display unit 151, the controller 180 may display a region corresponding to the detected information regarding a home screen, among the first and second regions 251a and 251b, in a highlighted manner.

In detail, in a case in which when the first home screen 252 corresponding to the first region 251a of the lock screen 251 has been displayed before the sleep mode is entered, as illustrated in (b) of FIG. 11, the controller 180 may release the sleep mode and display a magnified lock screen 251.

Meanwhile, as illustrated in (c) of FIG. 11, the controller 180 may release the sleep mode and display the first region 251a such that it is differentiated from the second region 251b. For example, the controller 180 may display the first region 251a such that at least one of a color, a shape, brightness, and transparency of the first region 251a is different from the second region 251b.

Figure 12:
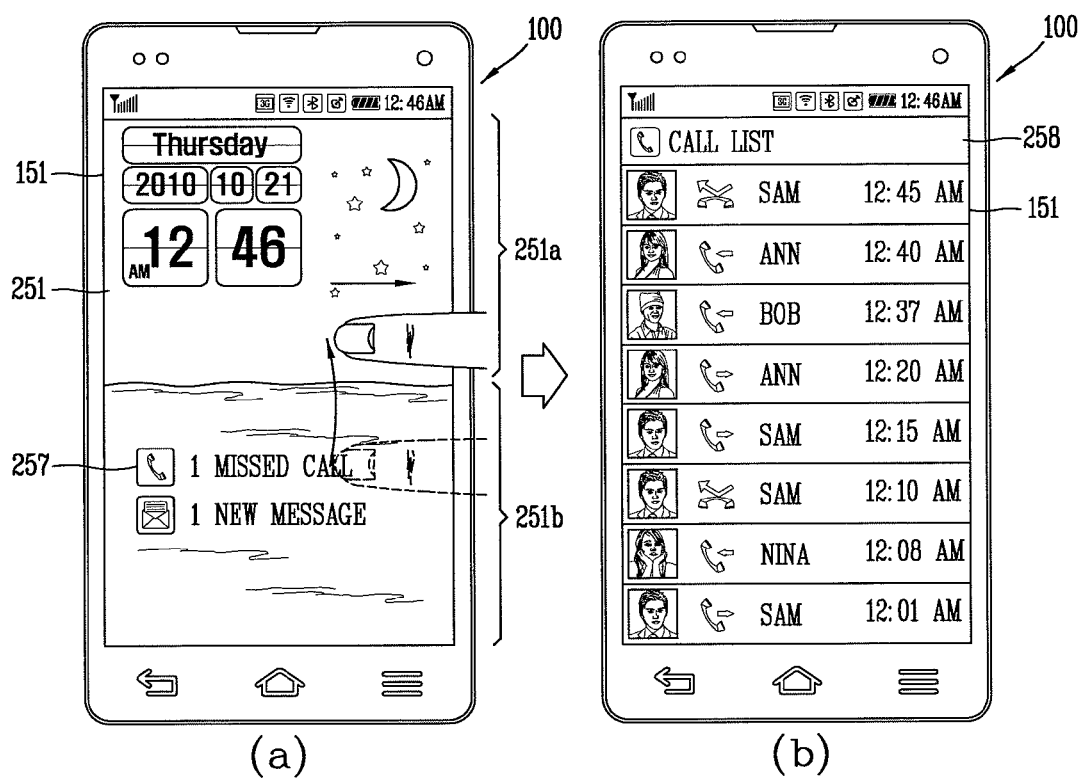
FIGS. 12 and 13 are display screens illustrating other embodiments of the present invention in which the body is controlled differently on the basis of a touch input with respect to notification information regarding a generated event.
Figure 13:
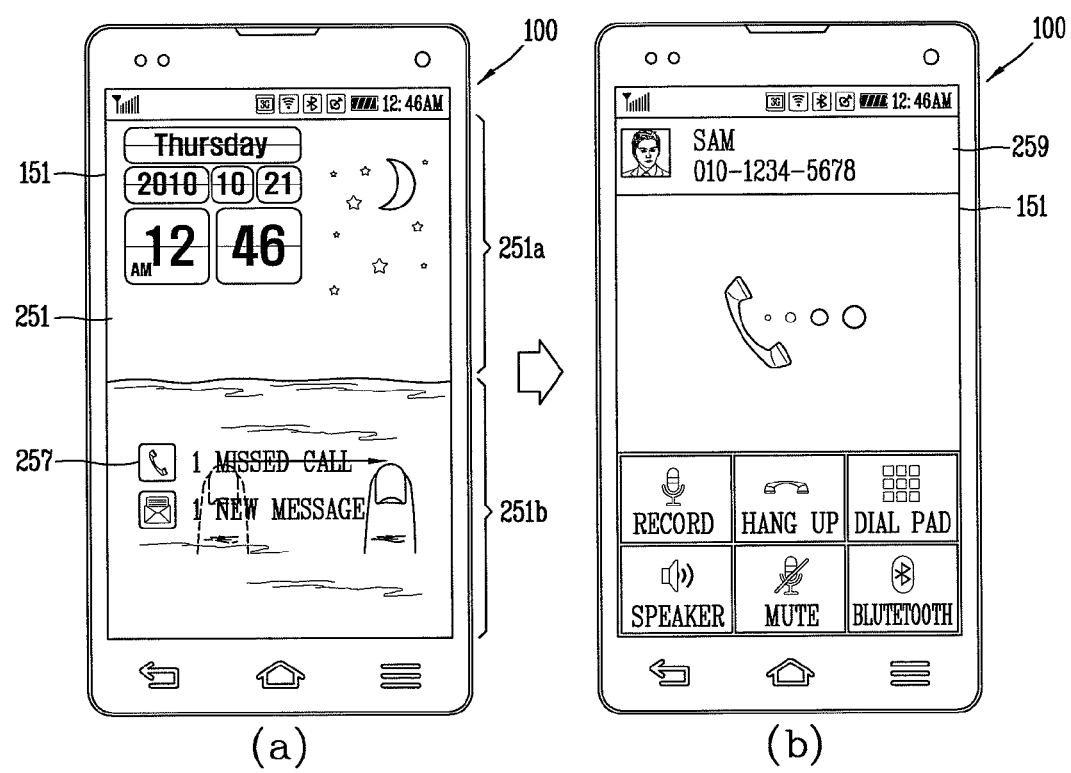

Next, FIGS. 12 and 13 are conceptual views illustrating other embodiments of the present invention in which the body is controlled differently on the basis of a touch input with respect to notification information regarding a generated event. Referring to (a) of FIG. 12 and (a) of FIG. 13, information may be displayed in the first and second regions 251a and 251b of the lock screen 251. The displayed information may be information set by the user or may be information set by the controller 180.

When an event occurs, the controller 180 may determines in which region of the lock screen 251 notification information regarding the generated event is to be displayed, on the basis of information regarding an attribute of the generated event. For example, as illustrated in (a) of FIG. 12 and (a) of FIG. 13, the controller 180 may display notification information regarding an absent call and notification information regarding an arrival of a new message in the second region 251b of the lock screen 251.

Meanwhile, a disposition of the notification information regarding an event may be changed on the lock screen 251. For example, on the basis of a user's touch input, notification information regarding an event may be moved from the second region 251b to the first region 251a so as to be displayed.

Also, on the basis of an amount of notification information regarding an event displayed in the first and second regions 251a and 251b of the lock screen 251, the controller 180 may change a size of the first and second regions 251a and 251b.

Meanwhile, when a touch input applied to the notification information regarding an event is sensed, the controller 180 may detect information regarding an attribute of the touch input. On the basis of the detected attribute information, the controller 180 may display detailed information regarding the event on the display unit 151 or execute a module related to the event.

In detail, when a first touch input (e.g., a drag input from the second region 251b to the first region 251a) applied to absent call notification information 257 is sensed, as illustrated in (b) of FIG. 12, the controller 180 may display detailed information 258 regarding the absent call on the display unit 151.

Here, the controller 180 may immediately release the lock mode or may release the lock mode after a touch input is applied to the detailed information 258 regarding the absent call.

Meanwhile, when a second touch input (e.g., a drag input from the left to the right in the second region 251b) applied to the absent call notification information 257 is sensed, as illustrated in (b) of FIG. 13, the controller 180 may control a module of the body to transmit a call signal to a counterpart mobile terminal from which the absent call was received (i.e., a counterpart mobile terminal of the absent call). Accordingly, a call signal transmission screen 259 may be displayed on the display unit 151.

At this time, the controller 180 may immediately release the lock mode. Meanwhile, although not shown, before the call signal transmission screen 259 is displayed on the display unit 151, a window for receiving a particular pattern for releasing the lock mode may be displayed. In this case, after the pre-set particular pattern is input, the controller 180 may release the lock mode.

Meanwhile, an embodiment in which the controller 180 selectively displays the detailed information 258 related to an absent call (refer to FIG. 12) or the call signal transmission screen 259 (refer to FIG. 13) on the display unit 151 on the basis of a direction of a touch input applied to the display unit 151 is illustrated in (b) of FIG. 13, but the present invention is not limited thereto. For example, the controller 180 may selectively display the detailed information 258 related to an absent call (refer to FIG. 12) or the call signal transmission screen 259 (refer to FIG. 13) on the display unit 151 on the basis of a tilt of the body.

Figure 14:
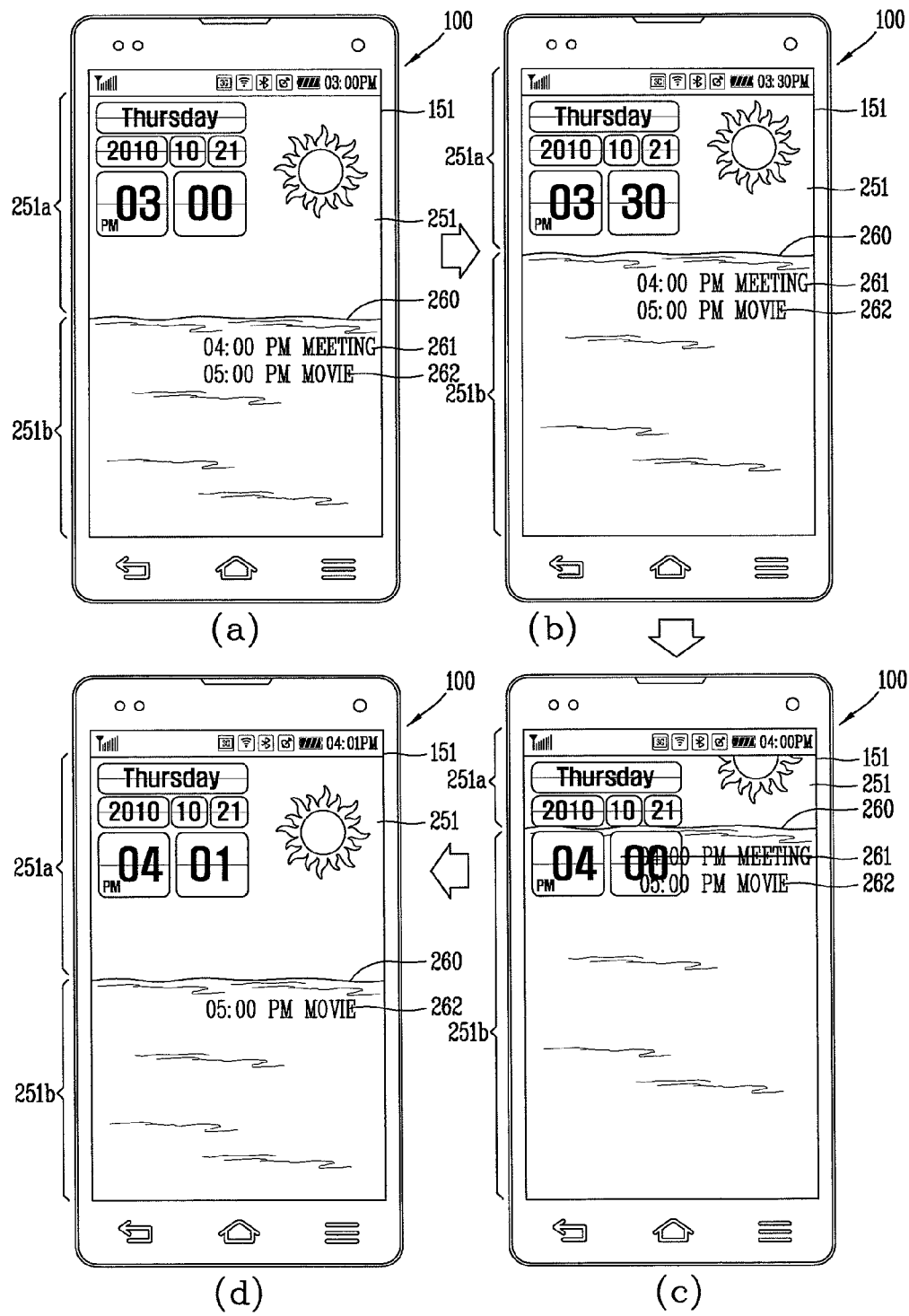
FIG. 14 is a display screen illustrating another embodiment of the present invention in which a size of a region in which schedule information is displayed is changed on the lock screen on the basis of information regarding a current time.

FIG. 14 is a conceptual view illustrating an embodiment of the present invention in which a size of a region in which schedule information is displayed is changed on the lock screen 251 on the basis of information regarding a current time. Referring to (a) of FIG. 14, information may be displayed in the first and second regions 251a and 251b of the lock screen 251. The displayed information may be information set by the user or information set by the controller 180. For example, information 261 and 262 regarding a schedule of the user may be displayed in the second region 251b of the lock screen 251.

When a pre-set touch input (e.g., a drag input from the first region 251a to the second region 251b) applied to the lock screen 251 is sensed, the controller 180 may display a window for receiving schedule information. The schedule information may be input on the basis of a user's touch pattern or may be input through a virtual keypad. The input schedule information may be displayed in the second region 251b of the lock screen 251.

The controller 180 may change a size of the region in which the schedule information 261 and 262 are displayed, on the basis of time information included in the schedule information 261 and 262 and current time information.

In detail, referring to (b) and (c) of FIG. 14, a position of the bar 260 dividing the first and second regions 251a and 251b may be changed until when a time (e.g., 4 o'clock) included in the first schedule information 261 arrives. Accordingly, a size of the second region 251b in which the first schedule information 261 is displayed may be increased. As illustrated, the controller 180 may provide, via the changing of the position of the bar 260, an effect that water rises, to the user.

Meanwhile, as illustrated in (c) of FIG. 14, when the current time is identical to the time included in the first schedule information 261, the controller 180 may display a pre-set object (e.g., a cancel line) in the first schedule information 261.

Thereafter, referring to (d) of FIG. 14, the controller 180 may delete the first schedule information 261. And then, the controller 180 may restore the sizes of the first and second regions 251a and 251b.

Thereafter, although not shown, the controller 180 may change a position of the bar 261 dividing the first and second regions 251a and 251b until when a time (e.g., 5 o'clock) included in the second schedule information 262 arrives.

Meanwhile, although not shown, when at least one of the first schedule information 261 and the second schedule information 262 displayed in the second region 251b is dragged toward the first region 251a, the controller 180 may display a widget of a calendar application in the first region 251a and reflect touched schedule information in the calendar application.

Figure 15:
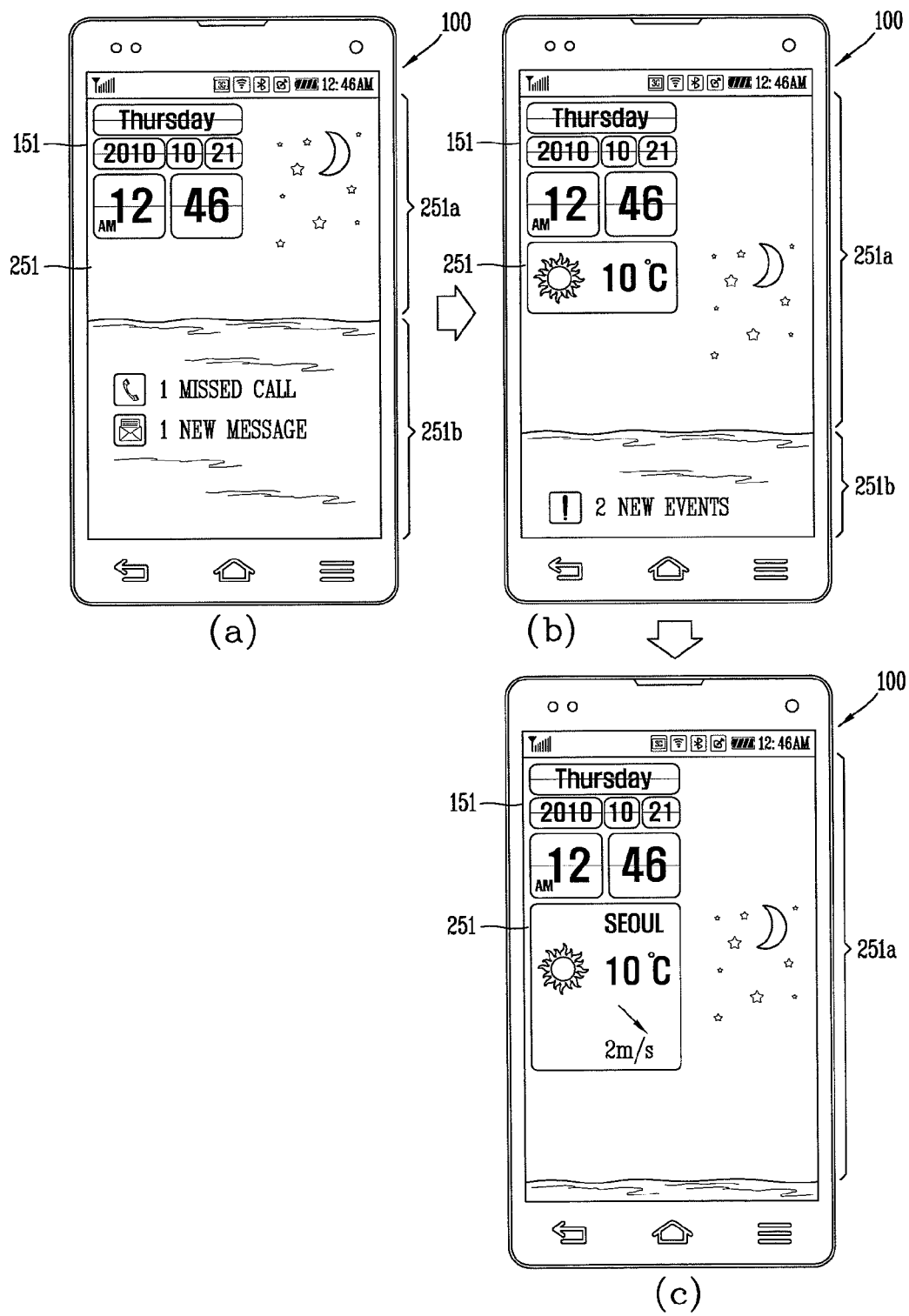
FIGS. 15 through 17 are display screens illustrating other embodiments of the present invention in which a proportion of each of a plurality of regions of the lock screen is changed on the basis of a tilt of the body.
Figure 16:
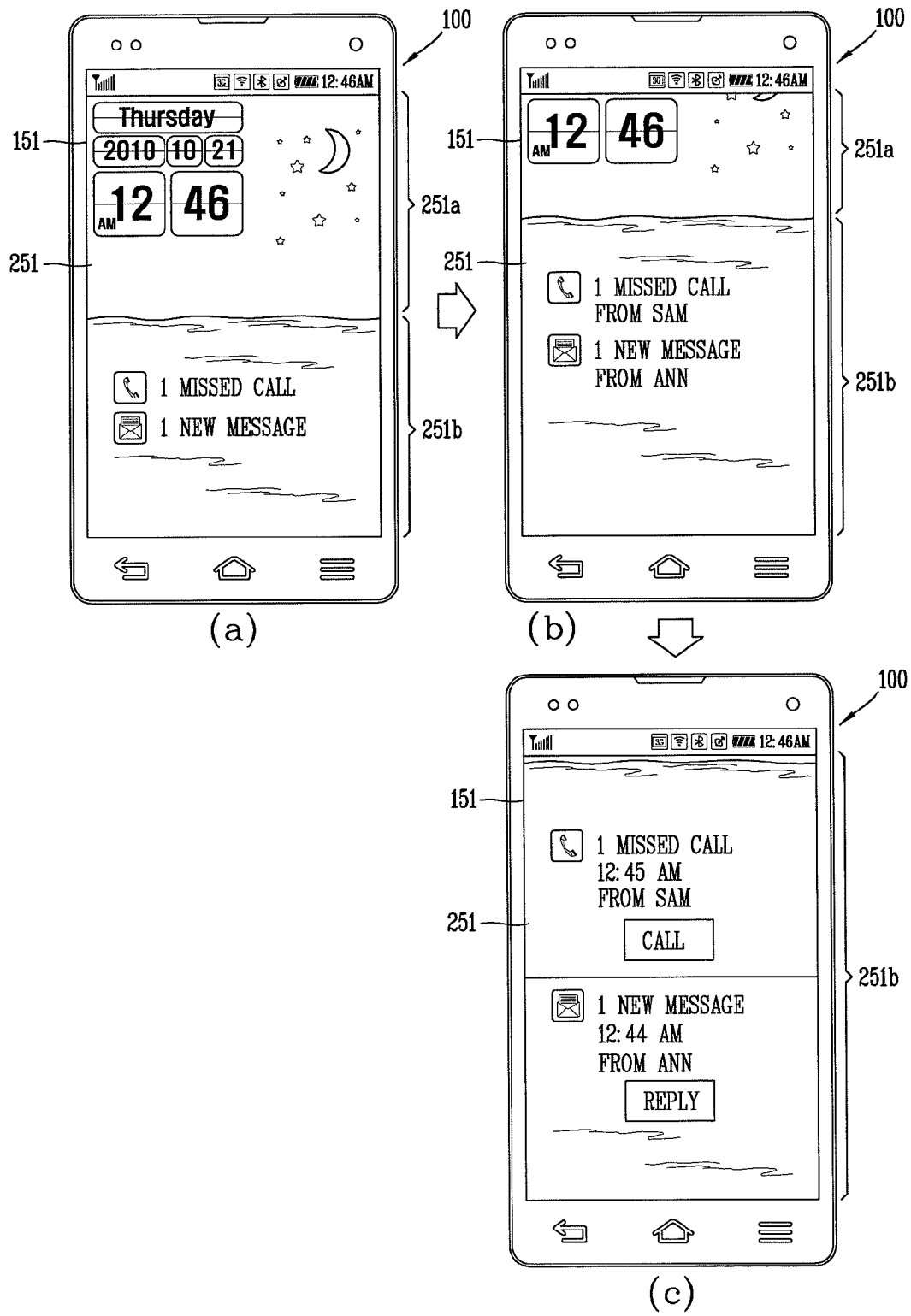
Figure 17:
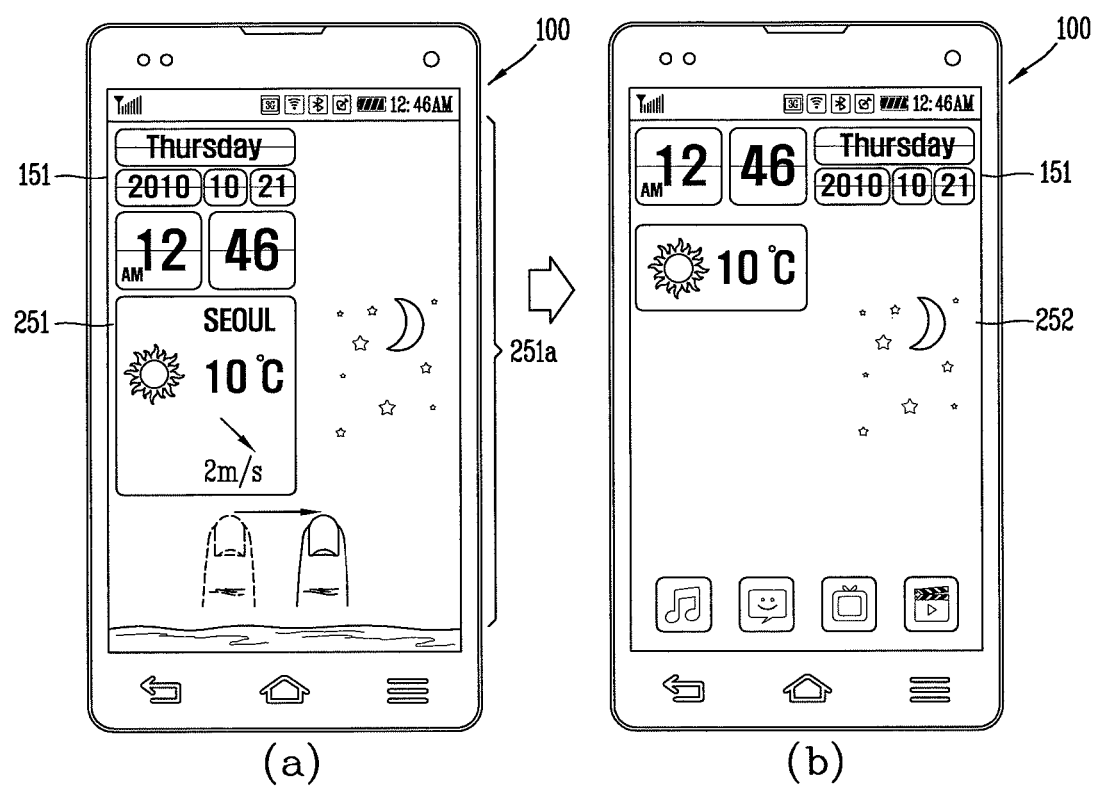

Next, FIGS. 15 through 17 are conceptual views illustrating embodiments of the present invention in which a proportion of each of a plurality of regions of the lock screen 251 is changed on the basis of a tilt of the body. Referring to (a) of FIG. 15 and (a) of FIG. 16, the controller 180 may display the lock screen 251 including the first and second regions 251a and 251b on the display unit 151.

The sensing unit 140 may sense a tilt of the body. In detail, the sensing unit 140 may include an operation recognition sensor. The operation recognition sensor may include at least one of a terrestrial magnetism sensor, a gyro sensor, and an acceleration sensor.

The terrestrial magnetism sensor is a sensor that detects a direction and size of a terrestrial magnetism and generates an electrical signal by using the detected direction and size of terrestrial magnetism. The gyro sensor is a sensor that detects a rotation speed of the body and generates an electrical signal by using the detected rotation speed of the body. The acceleration sensor is a sensor that measures a direction of an acceleration of gravity, detects a change in acceleration in any one direction, and generates an electrical signal by using the detected change in acceleration.

Thus, the sensing unit 140 may sense a tilt of the body. Namely, the sensing unit 140 may detect a displacement according to a tilt of the body, i.e., a direction of a tilt and an angle of a tilt, and generate an electrical signal by using the same.

On the basis of the electrical signal generated by the sensing unit 140, the controller 180 may change a proportion of each of the first and second regions 251a and 251b in the lock screen 251.

Referring to (b) of FIG. 15, the body in a stand-up state is sloped at a pre-set angle (e.g., at a first angle) in a first direction (e.g., an in an upward direction), and the controller 180 may increase the size of the first region 251a in the lock screen 251.

Meanwhile, as the proportions of the first and second regions 251a and 251b are changed, the controller 10 may change an amount of information displayed in each of the first and second regions 251a and 251b. As illustrated, as the size of the first region 251a is increased, weather information may be additionally displayed in the first region 251a. Also, as the size of the second region 251b is reduced, absent call notification information and new message arrival notification information are merged to be displayed as single event information in the second region 251b.

Although the example in which the absent call notification information and the new message arrival notification information are merged to be displayed as single event information in the second region 251b is illustrated, the present invention is not limited thereto and at least a portion of the event notification information which has been displayed in the second region 251b may disappear. The controller 180 may provide, via the changing of the position of the bar 260 and lowering of at least a portion the event information, such an effect that at least the portion of the event notification information sinks. Also, the controller 180 may provide such an effect that at least a portion of the event notification information simmers while sinking.

In addition, referring to (c) of FIG. 15, when the body in a stand-up state is sloped at a second angle greater than the first angle in the first direction (e.g., in the upward direction), the controller 180 may display only the first region 251a in the lock screen 251. Namely, the second region 251b may disappear from the display unit 151.

Thus, a larger amount of information may be displayed in the first region 251a. For example, besides weather information, regional information may be additionally displayed in the first region 251a. Meanwhile, as illustrated, as an image of the sky is displayed in the first region 251a, the controller 180 may display an image (e.g., an image of constellation, an image of weather, and the like) related to an augmented reality (AR) in the first region 251a.

Meanwhile, although the second region 251b disappears, the bar 260 which divides the first and second regions 251a and 251b may be continuously displayed on the display unit 151. Meanwhile, if the second region 251b disappears from the display and a pre-set touch input applied to the bar 260 is sensed, the controller 180 may display the second region 251b again on the display unit 151.

Meanwhile, referring to (b) of FIG. 16, when the body in a stand-up state is sloped at a pre-set angle (e.g., the first angle) in the second direction (e.g., in the downward direction), the controller 180 may increase the size of the second region 251b in the lock screen 251.

As illustrated, as the size of the first region 251a is reduced, the weather information which has been displayed in the first region 251a may disappear. Also, as the size of the second region 251b is increased, information regarding a counterpart related to each of the absent call notification information and new message arrival notification information may be displayed in the second region 251b.

Thereafter, referring to (c) of FIG. 16, when the body in a stand-up state is sloped at the second angle greater than the first angle in the first direction (e.g., in the downward direction), the controller 180 may display only the second region 251b in the lock screen 251. Namely, the first region 251a may disappear from the display unit 151.

Accordingly, a larger amount of information may be displayed in the second region 251b. For example, time information related to each of the absent call notification information and new message arrival notification information may be displayed in the second region 251b. Also, a button corresponding to a function of transmitting a call signal to a counterpart who has called but missed (i.e., an absent call) and a button corresponding to a function of replying to a counterpart who has sent a message may be additionally displayed.

Referring to (a) of FIG. 17, when the body is sloped at a pre-set angle, the controller 180 may display only one (e.g., the first region 251a) of the first and second regions 251a and 251b in the lock screen 251 on the display unit 151.

Here, when a touch input applied to the first region 251a to release the lock mode is sensed, as illustrated in (b) of FIG. 17, the controller 180 may detect information regarding the first home screen corresponding to the first region 251a and display the first home screen 252 on the basis of the detected information regarding the first home screen on the display unit 151.

Figure 18:
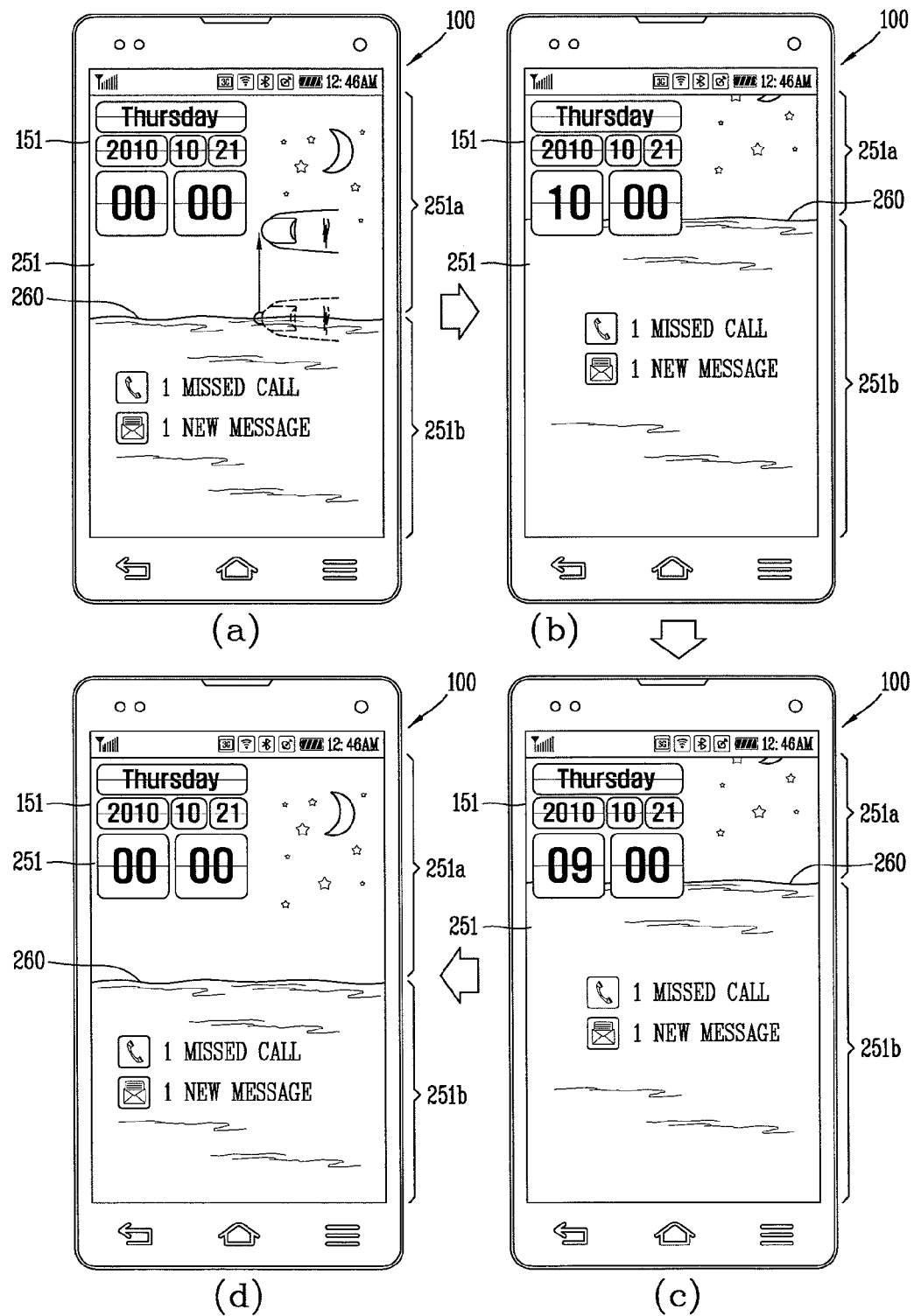
FIG. 18 is a display screen illustrating another embodiment of the present invention in which a time function is set by using a bar dividing a plurality of regions on the lock screen.

Next, FIG. 18 is a conceptual view illustrating an embodiment of the present invention in which a time function is set by using a bar dividing a plurality of regions on the lock screen. Referring to (a) of FIG. 18, the controller 180 may display the lock screen 251 including the first and second regions 251a and 251b on the display unit 151. The controller 180 may display current time information in the first region 251a.

Here, when a touch input applied to the bar 260 dividing the first and second regions 251a and 251b is sensed, the controller 180 may make the current time information disappear from the first region 251a and display reset time information (e.g., 00:00) for executing a timer function.

In this case, when a drag input applied to the bar 260 is sensed, as illustrated in (b) of FIG. 18, the controller 180 may detect a length of the drag input. On the basis of the detected length of the drag input, the controller 180 may set a time in a timer and display the information regarding the time (e.g., 10:00 (sec)) set in the timer in the first region 251a. Also, on the basis of the drag input, the controller 180 may change a position of the bar 260. Accordingly, a size of the second region 251b may be increased. As illustrated in FIG. 18, the controller 180 may provide, via the changing of the position of the bar 260, such an effect that water rises, to the user.

Thereafter, referring to (c) of FIG. 18, the controller 180 may change the position of the bar 260 until when the time of the timer reaches 0 seconds. Accordingly, as illustrated in (d) of FIG. 18, when the time of the timer reaches 0 seconds, the position of the bar 260 may be restored. Accordingly, the sizes of the first and second regions 261a and 251b may also be restored. As illustrated, the controller 180 may provide, via the changing of the position of the bar 260, such an effect that water is decreased, to the user.

Figure 19:
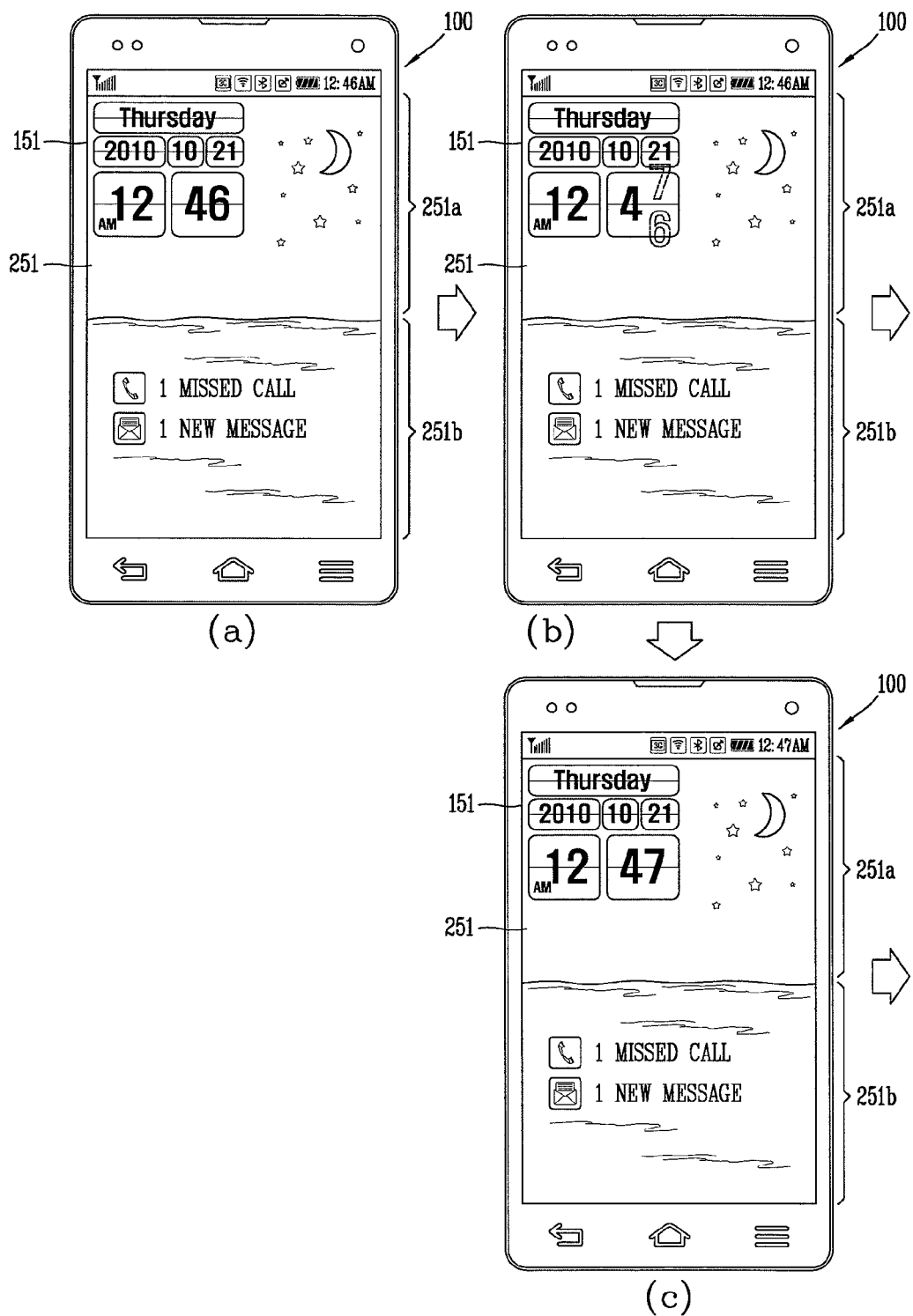
FIG. 19 is a display screen illustrating another embodiment of the present invention in which an object displayed on the lock screen is changed on the basis of information regarding a current time.

Next, FIG. 19 is a conceptual view illustrating an embodiment of the present information in which an object displayed on the lock screen is changed on the basis of information regarding a current time. Referring to (a) of FIG. 19, the controller may display the lock screen 251 including the first and second regions 251a and 251b on the display unit 151. An object indicating information regarding a current time may be displayed in the first region 251a of the lock screen 251.

When the current time is changed from 12:46 to 12:47, referring to (b) and (c) of FIG. 19, the controller 180 may provide such an effect that the object indicating '6' falls toward the second direction 251b. Also, the controller 180 may provide such an effect that the object indicating '7' makes an appearance.

Meanwhile, although not shown, the wireless communication unit 110 (refer to FIG. 1) may collect information regarding a current time and information regarding a location of the body. On the basis of the location information and time information, the controller 180 may change information displayed in each of the first and second regions 251a and 251b of the lock screen 251. For example, the controller 180 may change at least one of background image information and object information.

Also, when an object among a plurality of objects respectively indicating current time information displayed on the lock screen 251 is selected, the controller 180 may display detailed information (e.g., schedule information) related to time information, and corresponding to the selected object, on the lock screen 251. Here, the controller 180 may merge the first and second regions 251a and 251b of the lock screen 251. The controller 180 may display the detailed information in the lock screen 251 in which the first and second regions 251a and 251b are merged, or may display the detailed information in the region in which the selected object has been displayed on the lock screen 251.

Also, the controller 180 may display at least one widget in the lock screen 251. When any one of at least one widget is selected, the controller 180 may display detailed information related to the widget on the lock screen 251.

Figure 20:
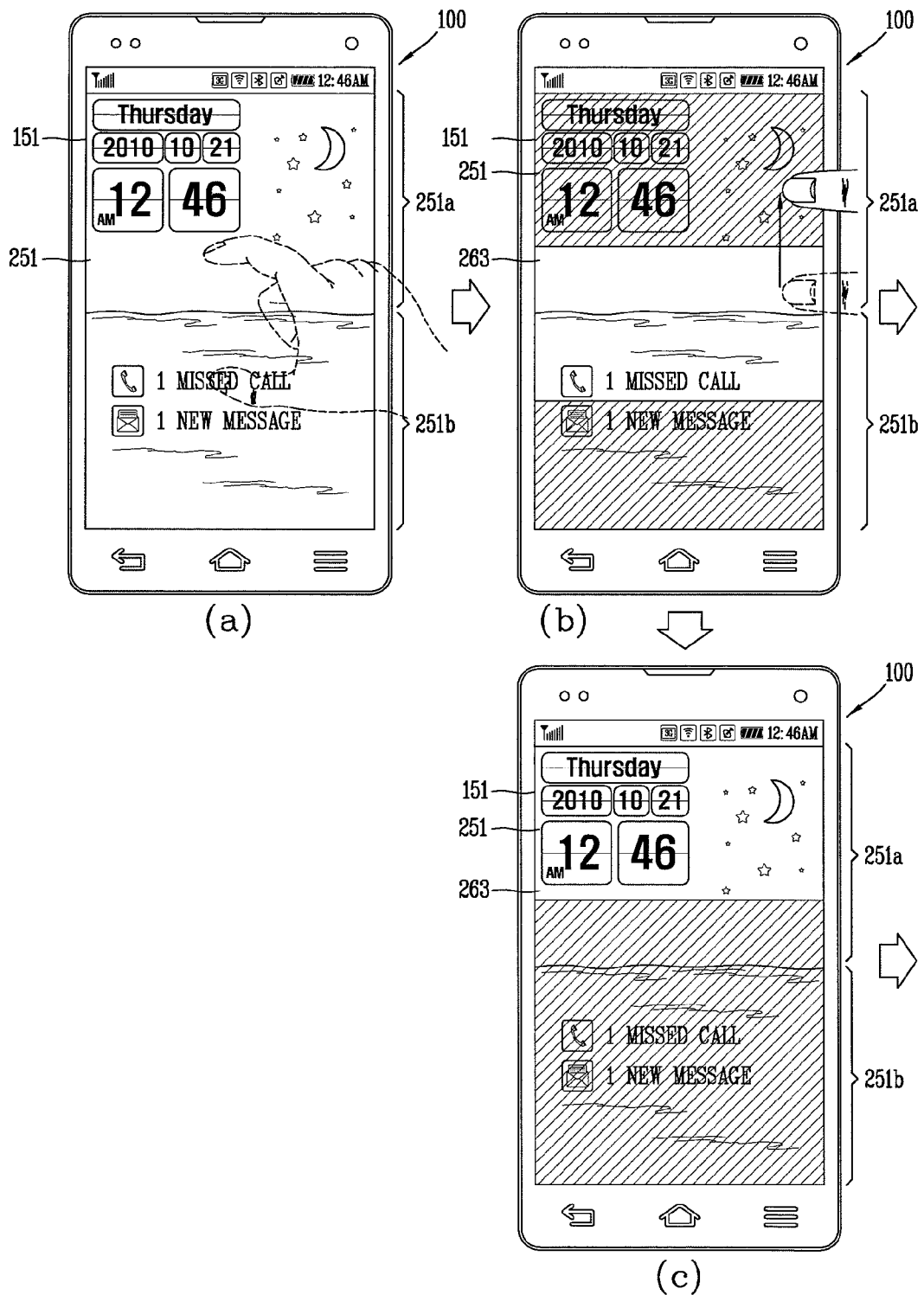
FIG. 20 is a display screen illustrating another embodiment of the present invention in which brightness of at least a partial region of the lock screen is adjusted on the basis of a touch input applied to the lock screen.

Next, FIG. 20 is a conceptual view illustrating an embodiment of the present invention in which brightness of at least a partial region of the lock screen 251 is adjusted on the basis of a touch input applied to the lock screen. Referring to (a) of FIG. 20, the controller 180 may display the lock screen 251 including the first and second regions 251a and 251b on the display unit 151. Here, when a pre-set touch input (e.g., a multi-touch input) applied to the lock screen 251 is sensed, as illustrated in (b) of FIG. 20, the controller 180 may generate a new region 263 on the basis of the sensed multi-touch input.

The controller 180 may adjust brightness such that the generated region 263 and the other regions are discriminated from each other. For example, as illustrated, the controller 180 may adjust brightness of the other regions, excluding the generated region 263, such that it is darker.

Meanwhile, when the generated region 263 is dragged in a particular direction (e.g., in an upward direction), referring to (c) of FIG. 20, the controller 180 may change a position of the generated region 263. Accordingly, the controller 180 may adjust brightness of the other regions, excluding the region 263 which has been changed in position, such that it is darker.

Meanwhile, when a pre-set touch input (e.g., a pinch-in touch input) applied to the lock screen 251 is sensed, the controller 180 may change a setting of the body into a silent mode and display the entire region of the lock screen 251 darkly and gradationally.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves (e.g., transmission via the Internet).

The mobile terminal according to the embodiments of the present disclosure as described above is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a terminal body;
a display configured to display a lock screen including a plurality of regions in a lock mode in which an input of a control command with respect to an application is limited; and
a controller configured to, when a touch input applied to a region among the plurality of regions of the lock screen to release the lock mode is sensed:
detect home screen information regarding a specific home screen corresponding to the touched region;
display information related to the touched region on the display for a pre-set period of time;
release the lock mode when the pre-set period of time has passed; and
display the specific home screen corresponding to the touched region based on the detected home screen information on the display in response to the releasing of the lock mode.

2. The mobile terminal of claim 1, wherein the information related to the touched region includes detailed information related to information displayed in the touched region in the lock screen.

3. The mobile terminal of claim 1, wherein when a touch input applied to a region among the plurality of regions of the lock screen is sensed, the controller is further configured to:
detect information regarding a setting of the terminal body corresponding to the touched region, and
change the setting of the terminal body based on the detected setting information.

4. The mobile terminal of claim 3, wherein the controller sets at least one of a password and a touch pattern to be received for releasing the lock mode differently in each of the plurality of regions.

5. The mobile terminal of claim 1, further comprising:
a user input unit configured to receive a control command for releasing a sleep mode,
wherein when the control command for releasing the sleep mode is received through the user input unit, the display displays the lock screen including the plurality of regions, and
wherein the controller detects the home screen information regarding the specific home screen displayed before entering the sleep mode, and displays a region among the plurality of regions and corresponding to the detected home screen information regarding the specific home screen displayed before entering the sleep mode in a highlighted manner.

6. The mobile terminal of claim 1, wherein when an event is generated, the display displays notification information regarding the generated event on the lock screen, and
wherein the controller determines a region among the plurality of regions of the lock screen in which the notification information regarding the generated event is to be displayed, based on information regarding an attribute of the generated event.

7. The mobile terminal of claim 6, wherein when a touch input applied to the notification information regarding the generated event is sensed, the controller detects information regarding an attribute of the sensed touch input, and
wherein the controller selectively executes at least one of a function selected from displaying detailed information regarding the generated event, and executing a module related to the generated event based on the detected information regarding the attribute of the generated event.

8. The mobile terminal of claim 6, wherein the display displays schedule information in a region among the plurality of regions, and
wherein the controller changes a size of the region in which the schedule information is displayed, based on time information included in the schedule information and current time information.

9. The mobile terminal of claim 1, further comprising:
a sensing unit configured to sense a tilt of the terminal body,
wherein the controller changes a proportion of each of the plurality of regions in the lock screen based on the sensed tilt of the terminal body.

10. The mobile terminal of claim 9, wherein, while changing the proportion of each of the plurality of regions, the controller changes an amount of information displayed in each of the plurality of regions.

11. The mobile terminal of claim 9, wherein when the tilt of the terminal body corresponds to a pre-set tilt, the display displays only a region among the plurality of regions, and
wherein, when a touch input applied to the region displayed when the tilt of the terminal body corresponds to the pre-set tilt is sensed to release the lock mode, the controller detects the home screen information regarding the specific home screen corresponding to the region displayed when the tilt of the terminal body corresponds to the pre-set tilt, and displays the specific screen based on the detected home screen information regarding the specific home screen corresponding to the region displayed when the tilt of the terminal body corresponds to the pre-set tilt.

12. The mobile terminal of claim 1, wherein the display displays at least one widget on the lock screen, and
wherein, when the at least one widget displayed on the lock screen is selected, the controller displays detailed information related to the selected widget on the lock screen.

13. The mobile terminal of claim 1, wherein the display displays a bar dividing the plurality of regions in the lock screen, and
wherein the controller sets a timer function based on a touch input applied to the bar.

14. The mobile terminal of claim 1, further comprising:
a wireless communication unit configured to collect at least one of information regarding a position of the terminal body and time information,
wherein the controller changes information displayed in the plurality of regions of the lock screen based on at least one of the position information and time information.

15. A method for controlling a mobile terminal, the method comprising:
displaying, via a display, a lock screen including a plurality of regions in a lock mode in which an input of a control command with respect to an application is limited;
sensing a touch input applied to a region among the plurality of regions of the lock screen to release the lock mode;
detecting home screen information regarding a specific home screen corresponding to the touched region;
displaying information related to the touched region on the display for a pre-set period of time;
releasing the lock mode when the pre-set period of time has passed; and
displaying the specific home screen corresponding to the touched region based on the detected home screen information on the display in response to the releasing of the lock mode.

16. The method of claim 15, further comprising:
sensing a tilt of the terminal body; and
changing a proportion of each of the plurality of regions in the lock screen based on the sensed tilt of the terminal body.

17. The mobile terminal of claim 1, wherein the plurality of regions included in the lock screen and displayed in the lock mode include upper and lower regions and the display displays a bar dividing the upper region from the lower region, and
wherein the bar dividing the upper region from the lower region is moved up as a current time approaches to a scheduled time.

18. The mobile terminal of claim 17, wherein, when a touch input applied to an upper region or a lower region is sensed, the controller displays information related to the touched upper or lower region in the touched upper or lower region, respectively, on the display, and
wherein, when the bar dividing the upper region from the lower region is moved up as the current time approaches to the scheduled time, the controller decreases or increases an amount of the information displayed on the touched upper or lower region, respectively.

* * * * *